US008260893B1

(12) United States Patent
Bandhole et al.

(10) Patent No.: US 8,260,893 B1
(45) Date of Patent: Sep. 4, 2012

(54) METHOD AND SYSTEM FOR AUTOMATED MANAGEMENT OF INFORMATION TECHNOLOGY

(75) Inventors: Jagadish S. Bandhole, Cupertino, CA (US); Thiruvillamalai K. Lakshman, San Carlos, CA (US); Sekeran Nanja, San Jose, CA (US); Hsu Chih Wang Chang, San Francisco, CA (US)

(73) Assignee: Symantec Operating Corporation, Mountain View, CA (US)

( * ) Notice: Subject to any disclaimer, the term of this patent is extended or adjusted under 35 U.S.C. 154(b) by 958 days.

(21) Appl. No.: 10/909,635

(22) Filed: Aug. 2, 2004

Related U.S. Application Data

(60) Provisional application No. 60/585,793, filed on Jul. 6, 2004.

(51) Int. Cl.
*G06F 15/173* (2006.01)
(52) U.S. Cl. .......................... 709/223; 709/221; 709/224
(58) Field of Classification Search .................... 709/223
See application file for complete search history.

(56) References Cited

U.S. PATENT DOCUMENTS

| | | | |
|---|---|---|---|
| 4,925,311 A | 5/1990 | Neches et al. ................ 364/200 |
| 5,191,611 A | 3/1993 | Lang ................................ 380/25 |
| 5,394,522 A | 2/1995 | Sanchez-Frank et al. ..... 395/159 |
| 5,410,707 A | 4/1995 | Bell ................................... 713/2 |
| 5,418,918 A | 5/1995 | Vander Kamp et al. .......... 713/2 |
| 5,452,454 A | 9/1995 | Basu ................................. 713/2 |
| 5,463,766 A | 10/1995 | Schieve et al. .................... 713/2 |
| 5,479,599 A | 12/1995 | Rockwell et al. ............. 395/155 |
| 5,515,524 A | 5/1996 | Lynch et al. ..................... 703/13 |
| 5,555,370 A | 9/1996 | Li et al. .......................... 715/763 |
| 5,577,210 A | 11/1996 | Abdous et al. ................ 709/219 |
| 5,668,995 A | 9/1997 | Bhat ............................. 718/104 |
| 5,694,600 A | 12/1997 | Khenson et al. .................. 713/2 |
| 5,727,213 A | 3/1998 | Vander Kamp et al. .......... 713/2 |
| 5,802,290 A | 9/1998 | Casselman .................... 709/201 |
| 5,842,011 A | 11/1998 | Basu ................................. 713/2 |
| 5,894,571 A | 4/1999 | O'Connor ......................... 713/2 |
| 5,942,738 A | 8/1999 | Cesaire et al. ................ 235/380 |
| 5,948,101 A | 9/1999 | David et al. ....................... 713/2 |
| 5,974,443 A | 10/1999 | Jeske ............................. 709/202 |

(Continued)

FOREIGN PATENT DOCUMENTS

EP 0 745 929 12/1996

(Continued)

OTHER PUBLICATIONS

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huana-Peter.pdf.

(Continued)

*Primary Examiner* — Larry Donaghue
*Assistant Examiner* — Nicholas Taylor
(74) *Attorney, Agent, or Firm* — Campbell Stephenson LLP

(57) ABSTRACT

The present invention provides a method and system for automated management of information technology. A computer-implemented method according to the present invention includes detecting a condition in an infrastructure, automatically determining an action to be taken and automatically performing the action. The automatically determining is performed in response to the detecting, and the action is in response to the condition.

31 Claims, 13 Drawing Sheets

U.S. PATENT DOCUMENTS

| | | | |
|---|---|---|---|
| 5,974,547 A | 10/1999 | Klimenko | 713/2 |
| 6,002,871 A | 12/1999 | Duggan et al. | 717/135 |
| 6,009,507 A | 12/1999 | Brooks et al. | 712/28 |
| 6,058,113 A | 5/2000 | Chang | 370/390 |
| 6,081,846 A | 6/2000 | Hyder et al. | 709/250 |
| 6,081,864 A | 6/2000 | Lowe et al. | 710/129 |
| 6,085,318 A | 7/2000 | Vander Kamp et al. | 713/1 |
| 6,092,189 A | 7/2000 | Fisher | 713/1 |
| 6,098,067 A | 8/2000 | Erickson | 707/10 |
| 6,101,601 A | 8/2000 | Matthews et al. | 713/2 |
| 6,122,738 A | 9/2000 | Millard | 713/187 |
| 6,182,123 B1 | 1/2001 | Filepp et al. | 709/217 |
| 6,182,275 B1 | 1/2001 | Beelitz et al. | 717/1 |
| 6,189,100 B1 | 2/2001 | Barr et al. | 713/182 |
| 6,192,518 B1 | 2/2001 | Neal | 717/175 |
| 6,202,091 B1 | 3/2001 | Godse | 709/222 |
| 6,230,200 B1 | 5/2001 | Forecast et al. | 709/226 |
| 6,259,448 B1 | 7/2001 | McNally | 345/348 |
| 6,262,726 B1 | 7/2001 | Stedman et al. | 345/333 |
| 6,266,678 B1 | 7/2001 | McDevitt | 707/201 |
| 6,282,709 B1 | 8/2001 | Reja et al. | 717/175 |
| 6,298,443 B1 | 10/2001 | Colligan et al. | 713/200 |
| 6,304,965 B1 | 10/2001 | Rickey | 713/2 |
| 6,308,238 B1 | 10/2001 | Smith et al. | 710/310 |
| 6,370,560 B1 | 4/2002 | Robertazzi et al. | 709/105 |
| 6,374,336 B1 | 4/2002 | Peters et al. | 711/167 |
| 6,393,557 B1 | 5/2002 | Guthridge | 713/1 |
| 6,421,777 B1 | 7/2002 | Pierre-Louis et al. | 713/2 |
| 6,446,126 B1 | 9/2002 | Huang et al. | 709/226 |
| 6,463,530 B1 | 10/2002 | Sposato | 713/2 |
| 6,466,972 B1 | 10/2002 | Paul et al. | 709/222 |
| 6,466,978 B1 | 10/2002 | Mukherjee et al. | 709/225 |
| 6,477,624 B1 | 11/2002 | Kedem et al. | 711/147 |
| 6,490,564 B1 | 12/2002 | Dodrill et al. | 704/275 |
| 6,493,679 B1 | 12/2002 | Rappaport et al. | 705/29 |
| 6,498,791 B2 | 12/2002 | Pickett et al. | 370/353 |
| 6,512,526 B1 | 1/2003 | McGlothlin et al. | 345/762 |
| 6,539,456 B2 | 3/2003 | Stewart | 711/113 |
| 6,543,047 B1 | 4/2003 | Vrhel, Jr. et al. | 717/121 |
| 6,550,006 B1 | 4/2003 | Khanna | 713/2 |
| 6,560,606 B1 | 5/2003 | Young | 707/100 |
| 6,564,112 B1 | 5/2003 | Factor | 700/97 |
| 6,577,229 B1 | 6/2003 | Bonneau et al. | 340/10.41 |
| 6,578,076 B1 * | 6/2003 | Putzolu | 709/223 |
| 6,578,141 B2 | 6/2003 | Kelley et al. | 713/1 |
| 6,598,131 B2 | 7/2003 | Kedem et al. | 711/147 |
| 6,601,095 B1 | 7/2003 | Duffield et al. | 709/222 |
| 6,601,166 B1 | 7/2003 | Avyar et al. | 713/2 |
| 6,604,238 B1 | 8/2003 | Lim et al. | 717/177 |
| 6,615,365 B1 | 9/2003 | Jenevein et al. | 714/6 |
| 6,633,916 B2 | 10/2003 | Kauffman | 709/229 |
| 6,662,267 B2 | 12/2003 | Stewart | 711/113 |
| 6,668,327 B1 | 12/2003 | Prabandham et al. | 726/4 |
| 6,684,327 B1 | 1/2004 | Anand et al. | 713/2 |
| 6,711,688 B1 | 3/2004 | Hubacher et al. | 713/201 |
| 6,748,525 B1 | 6/2004 | Hubacher et al. | 713/1 |
| 6,751,662 B1 * | 6/2004 | Natarajan et al. | 709/223 |
| 6,757,837 B1 | 6/2004 | Platt et al. | 714/4 |
| 6,768,901 B1 | 7/2004 | Osborn et al. | 455/230 |
| 6,802,062 B1 | 10/2004 | Oyamada et al. | 718/1 |
| 6,804,774 B1 | 10/2004 | Larvoire et al. | 713/2 |
| 6,810,478 B1 | 10/2004 | Anand et al. | 713/2 |
| 7,058,700 B1 | 6/2006 | Casalaina | 709/220 |
| 7,065,637 B1 | 6/2006 | Nanja | 713/1 |
| 7,082,521 B1 | 7/2006 | Nanja | 713/1 |
| 2001/0011304 A1 | 8/2001 | Wesinger, Jr. et al. | 709/227 |
| 2002/0069369 A1 | 6/2002 | Tremain | 713/201 |
| 2002/0172222 A1 * | 11/2002 | Ullmann et al. | 370/468 |
| 2003/0009552 A1 * | 1/2003 | Benfield et al. | 709/224 |
| 2003/0046529 A1 | 3/2003 | Loison et al. | 713/2 |
| 2004/0054780 A1 * | 3/2004 | Romero | 709/226 |
| 2005/0021723 A1 * | 1/2005 | Saperia | 709/223 |
| 2005/0188088 A1 * | 8/2005 | Fellenstein et al. | 709/226 |

FOREIGN PATENT DOCUMENTS

| | | |
|---|---|---|
| EP | 0 841 616 | 5/1998 |

OTHER PUBLICATIONS

Henry, Mike, Intel Corporation, *Extending PXE to Mobile Platforms*, Jun. 1998, pp. 1-4, http://www.intel.com/update/archive/psn/psn06985.pdf.

International Search Report as mailed from the PCT on Aug. 13, 2004 for WO Application (PCT/US03/28820; Filed Sep. 10, 2003), 3 pages).

Debenham, Clive, "Taos: The Operating System," May 29, 1995, Tantric Technologies, Newsgroups: comp.parallel.

Application Developer's Training Course, SNAP 8.0 Training Participant Guide, Module 7, Copyright © 1997, Template Software, Inc., pp. 7-1 through 7-34.

Workflow Template, Developing A WFT Workflow System, Copyright © 1998, Template Software, Inc., 352 pages.

Workflow Template, Using the WFT Development Environment, Copyright © 1998, Template Software, Inc., 412 pages.

Web Component, Using the Web Component, Copyright © 1997, Template Software, Inc.

Simon—"Computer System Built to Order"—Nov. 25, 1996—Newsgroups: demon.adverts, midlands.adverts, sanet.adverts, solent.forsale, uk.adverts.computer, unet.adverts, uk.adverts.other, dungeon.forsale.

\* cited by examiner

METHOD AND SYSTEM FOR AUTOMATED MANAGEMENT OF INFORMATION TECHNOLOGY

CROSS-REFERENCE TO RELATED APPLICATIONS

This application claims priority to U.S. Provisional patent application Ser. No. 60/585,793, filed Jul. 6, 2004, entitled "METHOD AND SYSTEM FOR AUTOMATED MANAGEMENT OF INFORMATION TECHNOLOGY," and naming J. Bandhole, T. Lakshman, S. Nanja and H. Wang as inventors. The above-referenced application is hereby incorporated by reference herein, in its entirety and for all purposes.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to the field of information technology systems management, and more particularly relates to a method and system for automating the management of information technology systems is disclosed.

2. Description of the Related Art

Today, information drives business, providing an organization with improved productivity and workflow. For businesses that increasingly depend on data and information for their day-to-day operations, such information technology systems are thus of critical importance. As dependence on such information technology systems has increased, the importance of efficiently and effectively managing such systems has also increased. Businesses are thus becoming increasingly aware of the costs and resources consumed by such management needs.

As used above, information technology (IT) typically concerns the design, organization, updating, operation and maintenance of networked computer systems. Such networks can be used not only for business, of course, but also for education, entertainment or other purposes. An entity such as a company, school or the like, usually has one or more IT employees whose job is to make sure computing resources such as computers, storage, software, communication and so on, are available to users.

As computer networks have become larger and more complex, the job of building and maintaining a network grows. The user base for a network often has needs that change with time. For example, a company may have a large need to run workplace applications such as word processing, database accessing, email, etc., during normal working hours. Some employees may do intermittent testing of software under development that uses a large number of computers, servers, or other resources. Data maintenance, such as database synchronization, data backup and the like, is performed from time-to-time.

Often, resources on a network are shared, such that computers, disk drives, communication paths and other such computing resources need to be allocated to make sure that users do not experience unwanted delays and that processes complete within desired times. The ability to determine where resources are needed and to quickly allocate resources is important to make full use of network and computation ability in an IT system. Such ability is achieved through IT management resources Whenever the workload spikes or maintenance is required, or in general, to respond to dynamic computing needs, IT managers must therefore perform manual processes to adapt the given computing infrastructure (or more simply, infrastructure) to the business's dynamic and ever-changing needs. The various needs of business, infrastructure changes and issues involving software applications drive dynamic workloads. Such business needs include the broadcasting of events and launching of products, software testing, peak-load hosting, customer support operations, high availability applications, web services and the like. Workload management typically includes two phases: (1) "detection" of varying workload and (2) "dynamic response" to varying workload. The "detection" phase typically detects changes in infrastructure including traffic management, host monitoring, network design, policy enforcement, cluster management and the like. The "dynamic response" phase typically includes making changes to the computing infrastructure by re-allocating (adding, removing, changing) infrastructure resources to adapt to the detected changes. Issues involving software applications also often include business processing, infrastructure, decision support, application development, collaborative applications, technical applications and the like. These new and diverse uses typically require labor-intensive operations to keep pace with the dynamic nature of such IT workloads. The manual nature of these key workload management tasks translates into high costs, slow response times and a greater likelihood of errors.

Some IT management functions are assisted by automated tools. For example, software for traffic monitoring, system and cluster management, storage utilization, etc., can be loaded and run while IT resources are being used productively. Such programs present information to IT employees who can then act on the information to configure or modify portions of the network, computers, or other resources, to provide better utilization, provisioning and other such advantages.

Although software exists to assist in reconfiguration and management, a large part of IT management is still performed manually by IT employees. Also, much software that does exist is not integrated. Software created by one manufacturer may not work well with other software from a different manufacturer. Some software applications or tools for IT management focus on either system monitoring or network traffic monitoring. Others have limited deployment tools for operating systems or applications.

The development of the mainframe workload management market has thus not translated to workload management solutions in the server and workstation markets. Furthermore, rapid innovation in IT infrastructure has increased heterogeneity of devices and resources on a network, while application demand has grown rapidly, both in the number of users and in types of uses of IT infrastructure. As a result, the fundamental needs of workload management have changed dramatically. Workload management needs to not only address disparate sources of workload monitoring, but also automate the response to IT workload variance via resource de-commissioning and re-commissioning in addition to resource control, provision, and update. From a business perspective, effective resource utilization, high availability, and reliability are unachievable without automated workload management.

As will be appreciated, then, the performance of information technology systems is maintained through the careful management of the computing resources that make up such systems, and therefore, such information technology systems often confront challenges such as those noted above. What is therefore needed is a technique that addresses these challenges. Such a solution should be capable of dynamically and automatically adapting such IT systems to changing IT requirements by drawing IT resources such as servers, software stacks, IP addresses, licenses, network elements, and storage, from a pool of resources for dynamic, just-in-time commissioning and de-commissioning based on dynamic demands on these heterogeneous IT resources. Moreover, such a solution should preferably do so with minimal supervision, in order to minimize the workload incurred in managing such systems, and should do so in as efficient a manner as is reasonably possible.

SUMMARY OF THE INVENTION

The present invention provides an integrated, automated approach to IT workload management. The present invention provides a method and system that addresses the foregoing limitations by providing an automated information technology management system. The present invention does so by providing functionality and features in hardware and software that work and integrate with and within computing environments that can have many different types of hardware and software components. The system can abstract software configurations from underlying hardware and store the configurations on the network. Hardware relationships are detected during software abstraction. Other hardware can be checked against the detected relationships to verify that the new hardware is compatible with the relationships and, hence, is compatible with hardware and software components of the network.

The system can work with software products from other manufacturers. One feature provides network configuration, including creating virtual local area networks (VLANs) and gateways, and assigning interne protocol (IP) and domain name server (DNS) addresses. Another aspect of the system allows automated remote management of the pre-boot process of different machines as well as subsequent customization of computers. Automated post-boot application, patch and script deployment is also provided with optional verification.

For example, hardware such as processors can be built by different manufacturers. Many instances of computer operating systems from companies can be executed on a number of different computers within a single IT system. Other software components can include web browsers, file transfer programs and other applications, protocol handlers, device drivers and the like.

In one embodiment of the present invention, an apparatus is disclosed. The apparatus includes a management server, which, in turn, includes a resource management module. The resource management module includes a detection module and a decision module.

In another embodiment of the present invention, a computer-implemented method is disclosed. The computer-implemented method includes detecting a condition in an infrastructure, automatically determining an action to be taken and automatically performing the action. The automatically determining is performed in response to the detecting. The action is in response to the condition.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
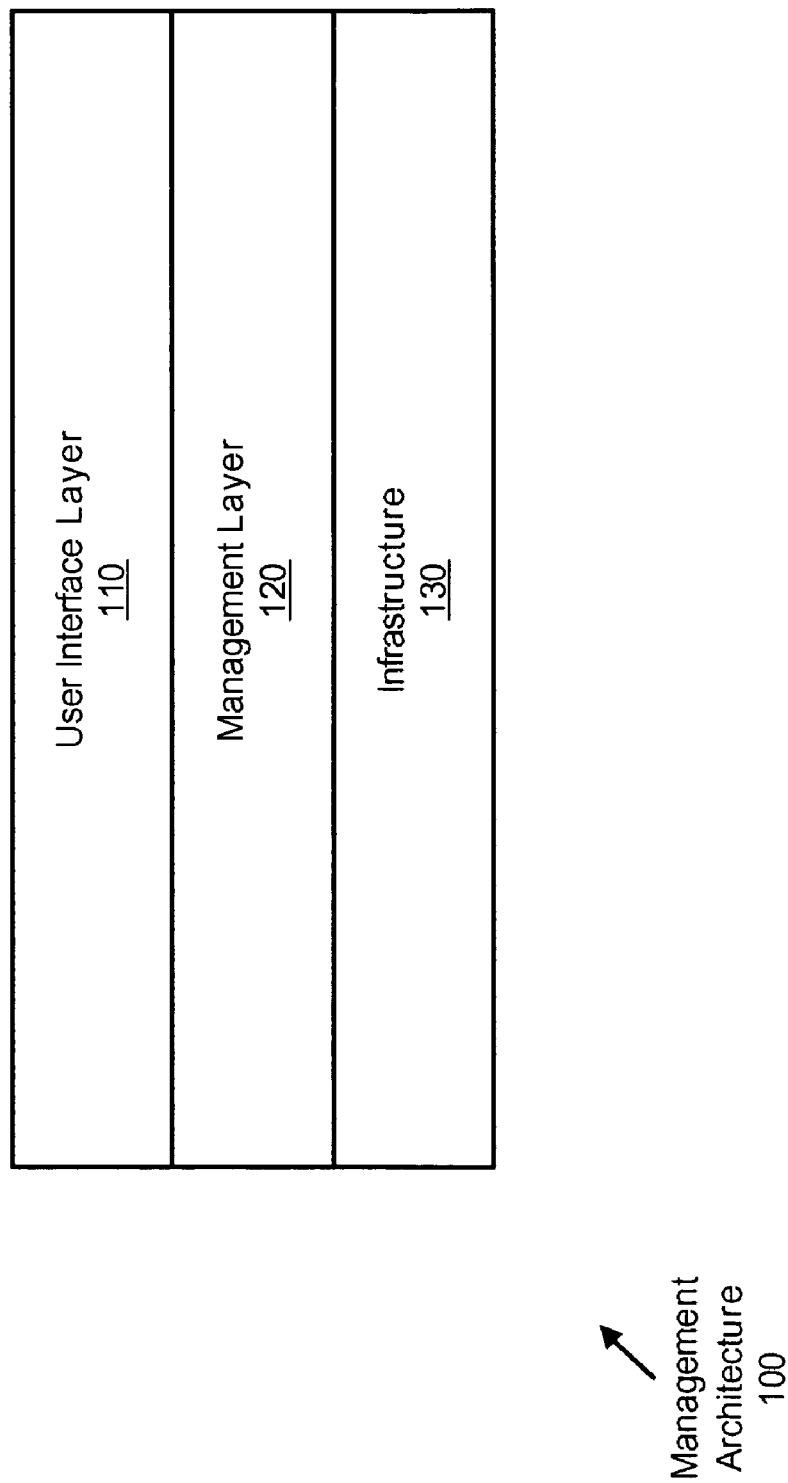
FIG. 1 is a block diagram illustrating a management architecture according to the present invention.

For a thorough understanding of the subject invention, refer to the following detailed description, including the appended claims, in connection with the above-described drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended claims.

In the following description, for purposes of explanation, numerous specific details are set forth in order to provide a thorough understanding of the invention. It will be apparent to one skilled in the art, however, that the present invention can be employed without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention is directed to a method and system for the automated management of information technology resources. By determining workload parameters such as capacity, load and priority, an automated IT management system of the present invention is able to detect situations requiring corrective action, and take such corrective action, with minimal (i.e., little or no) manual intervention by system administrators, users or other such persons. This substantial reduction in user intervention provides a number of advantages, including frequent monitoring/correction, fast response to changing workloads, improved workload management solutions, more efficient use of computing resources, and other such benefits.

The present invention enables automated commissioning, de-commissioning and re-commissioning of integrated IT resources, including network and storage elements, as well as servers. Thus, the present invention enables the availability of mission-critical IT resources to be maintained, in a cost-effective manner. Such capabilities provide significant advantages by automating manual management and correction tasks, increasing time efficiency and reducing administration and labor costs. Such features include the ability to add resources for increased workload, to remove resources for reduced workload, to replace resources for sustained workload and to maintain availability for mission-critical workload in the face of changing needs and infrastructure (e.g., failures and the like).

With regard to adding resources for increased workload, the present invention allows for the dynamic scaling of a multi-tiered architecture, and in so doing, allows the system to address unanticipated load spikes. This can be effected, for example, by having the resource management system put servers into service and take servers out-of-service. The workload is measured and monitored by interacting with traffic management devices such as load-balancers, seasonal load policies, host monitoring systems (using SNMP and other monitoring agents), cluster monitoring systems and the like. By interacting and communicating with existing products in the market through ITAP (IT abstraction protocol, discussed subsequently) and an XML-based data and control language (e.g., JXML, which is a Simple Object Access Protocol (SOAP) compatible language having JAVA and Perl applications programming interfaces (APIs)), the present invention automates the equipment-specific steps required to discover, deploy, customize and control the resources within an IT environment.

Moreover, in order to improve productivity and reduce costs, resources can be removed when the workload is reduced. For example, the present invention is able to automatically de-provision a resource (e.g., a server); to register relevant information (e.g., IP address, node name, pool name) with load balancers, switches, applications, and the like; to integrate with heterogeneous devices; and to perform other such operations. In this context, integration with heterogeneous devices can be achieved, for example, using standard protocols (e.g. SNMP, Telnet, SSH and the like) and ITAP (which supports the abstraction of computer, storage and network hardware elements and devices, and the like).

The present invention also supports the replacement of resources in situations in which a given workload must be sustained. The present invention also simplifies the maintenance of resources (e.g., servers) in a production environment. When faced with sustained workload, the present invention allows an administrator to seamlessly remove a server from service and replace that server without affecting others within its cluster or pool. Moreover, the present invention can, for example, remotely and automatically capture information regarding computers, network, and storage from "bare metal" (unconfigured hardware), through an entire IT stack. The present invention provides such capabilities via its ability to discover, track, and perform operations on different resources.

An important aspect of the present invention is its ability to improve resource availability for mission-critical workloads. The present invention includes, in one embodiment, what is referred to herein as an elemental server (and more generically, as a management server (or sub-system thereof)), which is tasked with providing the functionalities described herein (or a subset thereof). Such an elemental server automatically improves availability by managing clusters, by performing automated switchover to a new server when an existing server fails, by obviating the need for low-level technical interventions, by providing stateful failover and application persistence, and through its support of other such functions.

Typically, the metrics used in managing a given resource are the resource's capacity, the load placed on the resource and the resource's priority (or that of the activity employing the resource). The capacity and load metrics are, as would be expected, based on the kind of resource under management. Once a resource's capacity and load are determined, the resource's priority is examined. In a situation in which load exceeds capacity, or does so for all practical purposes (e.g., the case in which allowing 100% usage nearly guarantees failure due to minor variations in load), a determination regarding which requests are to be serviced, and which are not, must be made. More than choosing between which requests are to be serviced first, a determination may also be needed with regard to the preemption of requests currently being serviced, if the incoming request is of sufficient priority.

Once these parameters are determined, a system of the present invention possesses the information needed to make a determination as to whether to take action. What is also required, once the determination to take action has been made, is a determination as to what action or actions are to be taken. Thus, for a given metric, in the case in which load exceeds capacity, the system must then make a determination as to how to proceed. Corrective actions taken in response to such situations can include provisioning new resources, migrating resources to shift capacity to the activity experiencing a heavy load, application tuning or some other corrective action. Examples of the components of such IT management systems, and their operation, are now discussed.

Example Architectures Implementing an IT Management System

FIG. 1 is a block diagram illustrating a management architecture 100 according to the present invention. Management architecture 100 provides an event-driven automation of workload management in the management of IT infrastructure such as computing systems and other resources. Such events (or more generically, conditions) can include a wide variety of events, situations, criteria and the like, including one or more of a time-based condition, a bandwidth condition, a storage capacity condition and a processing capacity condition, among other possible conditions. Management architecture 100 includes a user interface layer 110, a management layer 120 and an infrastructure 130, which is managed by management layer 120. Management layer 120 can communicate with infrastructure 130 using, for example, a secure transmission control protocol/internet protocol (TCP/IP) designated the IT Abstraction Protocol (ITAP), which is discussed subsequently. User interface layer 110, management layer 120 and infrastructure 130 are discussed in greater detail subsequently.

Figure 2A:
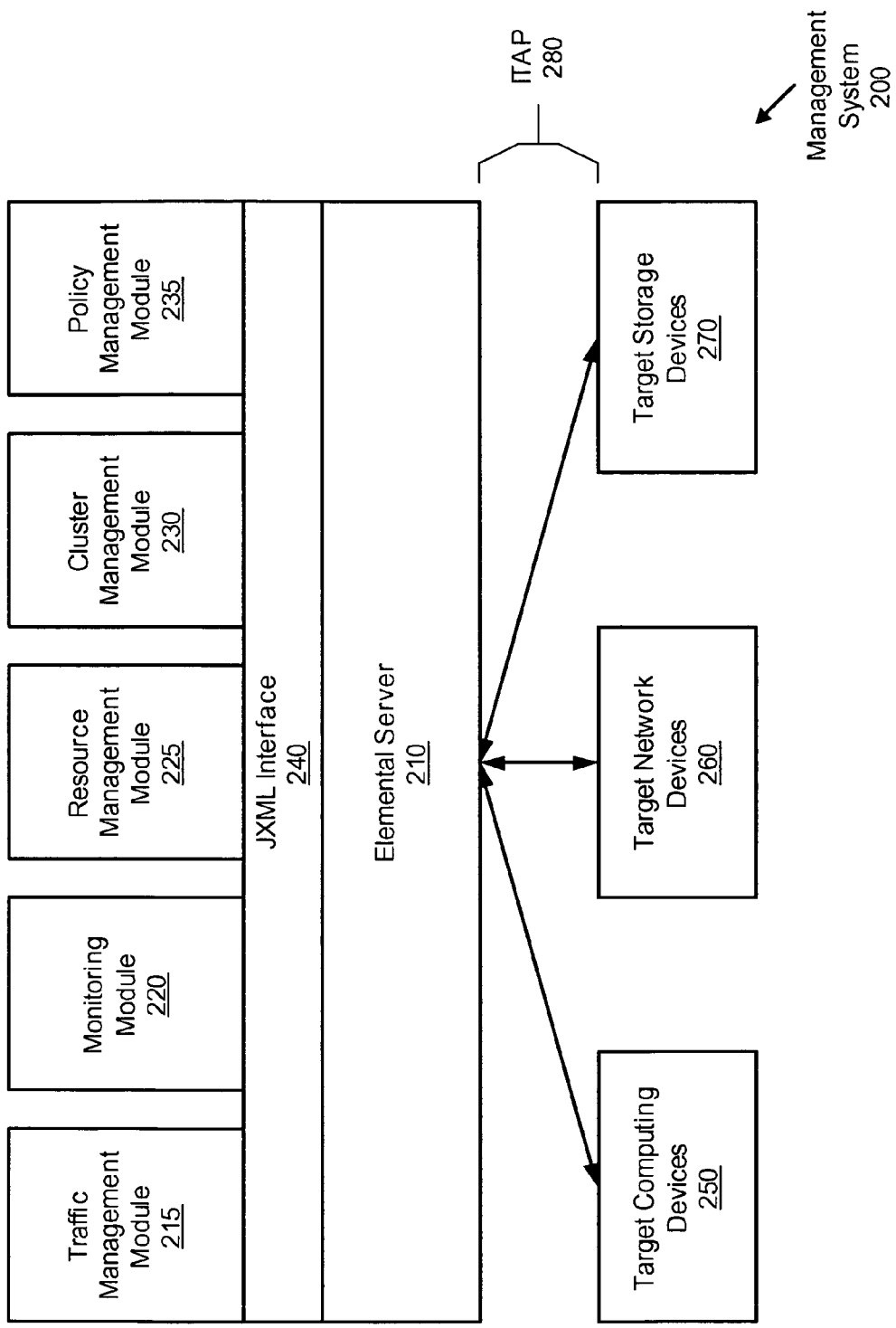
FIG. 2A is a block diagram illustrating a management system according to the present invention.

FIG. 2A is a block diagram illustrating a management system 200 according to the present invention, and as such, is a more detailed presentation of management architecture 100. Management system 200 includes an elemental server 210 that receives directives and information from a number of modules. These modules include a traffic management module 215, a monitoring module 220, a resource management module 225, a cluster management module 230 and a policy management module 235. Resource management module 225 provides for the addition, removal, replacement and maintenance of resources, among other such functionality, and effects such operations through communications with elemental server 210. Resource management module 225, as well as others of the modules illustrated in FIG. 2A, can communicate with elemental server 210 using an extensible language interface (e.g., a JXML interface 240), for example. Based on these communications, elemental server 210 configures target computing devices 250, target network devices 260 and target storage devices 270, via an ITAP protocol interface (depicted in FIG. 2 as an ITAP 280). IT will be appreciated that, in one embodiment, ITAP 280 is the mechanism via which conditions (existing or occurring in the aforementioned target devices) are acted upon. These actions are taken in response to information collected using a corresponding mechanism (e.g., information gathered using a protocol such as the simple network management protocol (SNMP)).

Traffic management module 215 detects and rectifies network traffic variance that could lead to workload variance: such traffic variance includes, among other factors, network traffic (e.g., IP network traffic, as determined on the various layers of the network OSI model), fiber-channel bandwidth traffic, application specific traffic, security- and management-related traffic, cross-component traffic (e.g., between components of an application), and the like. Monitoring module 220 extends the server host, operating system (OS), application and service level monitoring on individual computers, as well as integrating with traffic management module 215. Cluster management module 230 represents relationship between different nodes in an application cluster, as well as different instances of a component in a scale-out cluster. Policy management module 235 performs operations such as representing and verifying capacity planning, service level assurance metrics and other such metrics, which are then available for IT employees such as administrators to use in expressing their business needs.

Elemental server 210, which employs the IT Abstraction Protocol (ITAP, as ITAP 280), is an operations abstraction and integration server providing comprehensive IT management of heterogeneous servers, network devices, storage devices, and software. Elemental server 210 abstracts vendor-specific implementation complexities typically involved with manually controlling, provisioning, and updating IT resources. The manual and complex operations needed to provision and update servers with operating systems and applications; to create and control complex network topologies using switches, routers, firewalls, and load balancers; and to provision and control storage for applications are all automated and simplified by elemental server 210. Elemental server 210 provides a rich, standards-based, applications programming interface (API) to drive the control, provisioning and updating of such resources, and the performance of these operations. Elemental server 210 can also be configured such that device abstraction is provided, and thereby enable rapid qualification and support for new devices. These features provide a powerful development platform for creation of IT automation solutions and for integration with existing business processes.

Elemental server 210 controls, provisions and updates devices connected via a network (e.g., a TCP/IP fabric). Applications can be written that communicate with elemental server 210 using the JXML language. JXML is an XML-language that allows the representation of IT elements and the performing of operations on those elements. Additionally, elemental server 210 can be configured with a complete set of APIs (wrapper APIs for JXML), and documentation examples and tutorials provided, that help a developer easily create JXML-based applications for elemental server 210.

Elemental server 210 is an IT abstraction platform implemented as a server-side application. Elemental server 210, and so management system 200, implement:

Resource Models—An abstraction model in which each element of IT infrastructure (including compute servers, network devices, storage devices and software packages) are designated using a logical "resource" handle. Thus, each such element—hardware, software, a configuration or other pertinent component or information—is represented as a "resource", upon which operations can be performed. Resource operations typically transition a resource from a "free" state to a "being used" state, or vice versa, as well as methodically changing the resource behavior through a sequence of state transitions whilst the resource is in a "being used" state. Such resource operations in effect enable resource consumption to be prioritized, monitored, modified, and modeled.

Management Primitives—These are the operations that can be performed on various resources. Such operations can be context sensitive. For example, server resources have hardware discovery, provision, startup, reboot, shutdown, power-cycle, software update, remote access, re-provision, save, restore and other such operations and, similarly network devices have startup, shutdown, configure, restore-to-factory-default and other such operations. There are also IT configuration-related operations such as add, remove, modify IP addresses, VLANs and network segments, add servers to load balancers or clusters. Through resource models and management primitives, elemental server 210 provides the ability to manipulate devices without the knowledge of details such as the vendor type, model numbers, physical connectivity, hardware components, deployment constraints and so on, making IT management significantly simpler, faster and more reliable. Elemental server 210 implements management primitives through intelligent agents that use in-band and out-of-band protocols to operate on different resources. Many of these management primitives can further be grouped, scripted and automated based on schedules, policies and events resulting in cost-effective IT operations.

Figure 2B:
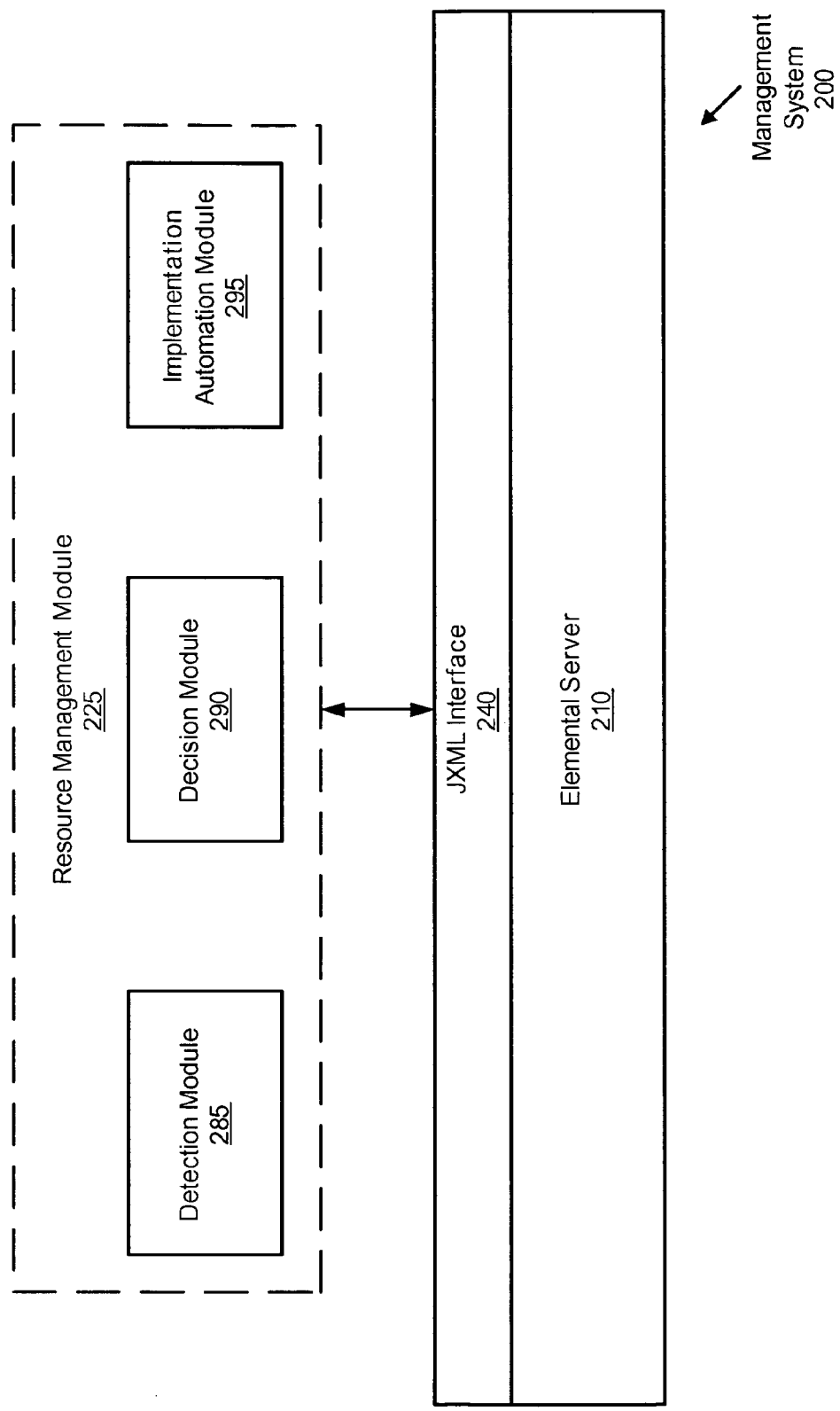
FIG. 2B is a block diagram illustrating certain portions of a management system according to the present invention in greater detail.

FIG. 2B is a block diagram illustrating certain portions of management system 200 in greater detail. In FIG. 2B, certain of the elements of resource management module 225 are depicted. These elements include a detection module 285, a decision module 290 and an implementation automation module 295. As will be appreciated, these functions can be merged into elemental server 210 (as depicted subsequently in FIG. 4). As noted, resource management module 225 is tasked with adding, removing, replacing and maintaining resources, along with other related responsibilities. Detection module 285 works in conjunction with traffic management module 215, monitoring module 220, and cluster management module 230 to detect situations in which management system 200 may need to take action in order to properly manage the workload of the system under management. Such situations are referred to herein as events.

Decision module 290 is tasked with making the decision as to whether such actions are, in fact, needed. Decision module 290 works in conjunction with policy management module 235 and is driven by resource management module 225. Decision module 290 can simply alert an administrator or other person to the situation, or can autonomously cause one or more actions to be taken. In the former case, decision module 290 delegates intelligent decision-making to a person, but continues to support the implementation of directives from the person in an automated manner. In the latter case, decision module 290 autonomously makes decisions regarding the configuration/re-configuration of the system under management, based on current policies, action definitions and other information. In fact, such a management system can be configured to use artificial intelligence, fuzzy logic and similar techniques, to allow such a management system to "learn" appropriate responses to various situations. This can be achieved, for example, by configuring the management system to monitor the results of its allocation/re-allocation decisions, and to determine the desirability of the given outcomes. Such determinations can use, for example, historical data and trending techniques, real-time feedback or other techniques.

As will be appreciated, these two techniques can be combined, with the management system always deferring to an administrator when first managing a system under management, and slowly taking over the management chores, as the management system "learns" the proper responses from the administrator. As time goes on, the management system becomes increasingly proficient, learning more about the characteristics of the system under management. The processes just discussed, as will be appreciated, are also extensible from a variety of perspectives. This is the case with the resources monitored, the parameters monitored, the activities monitored, the accuracy of monitoring required, the outcomes and other such aspects.

Implementation automation module 295 gives effect to the decisions made by decision module 290 (e.g., through traffic management module 215, cluster management module 230 and policy management module 235). This event driven automation approach thus determines the state of the system under test, and then effects changes to that system, in order to make the best use of that system's resources.

Figure 3:
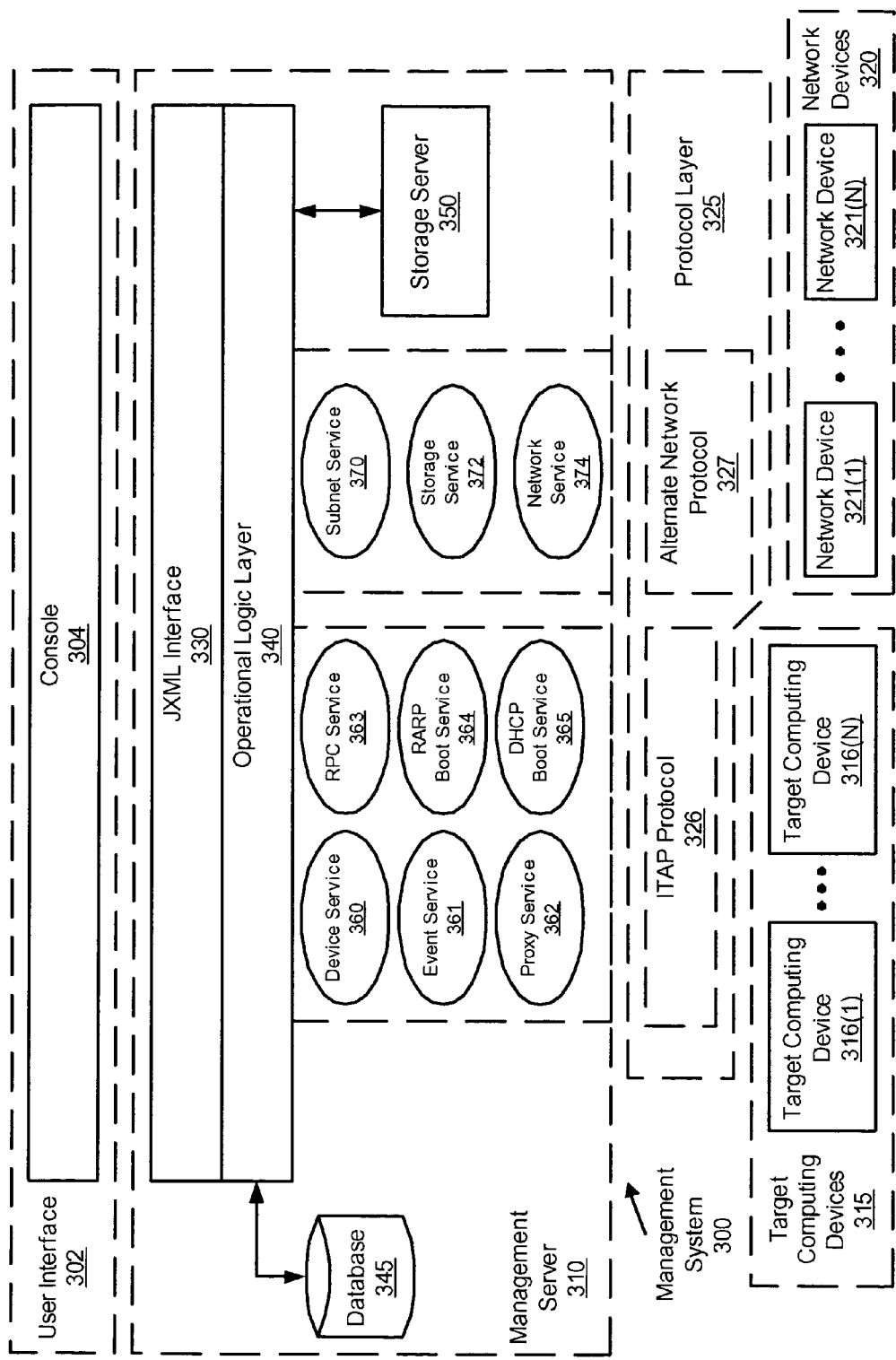
FIG. 3 is a block diagram illustrating a management system according to the present invention.

FIG. 3 is a block diagram illustrating a management system 300 according to the present invention. Management system 300 includes a user interface 302 (which, in turn, includes a console 304), a management server 310, target computing devices 315 and network devices 320. As will be appreciated, other devices and software modules can be configured and controlled by management server 310. Management server 310 communicates with target computing devices 315 (which include target computing devices 316(1)-(N)) and network devices 320 (which include network devices 321(1)-(N)), as well as other devices and software modules, via a protocol layer 325, which in fact represents communications performed using various network protocols (which, as depicted in FIG. 3, include an ITAP protocol 326 and an alternate network protocol 327).

Management server 310 communicates with user interface 302 through a JXML interface 330, as discussed previously.

JXML interface 330 interfaces user interface 302 to an operational logic layer (OLL) 340. OLL 340 supports in-context-provisioning capabilities of the elemental server discussed previously. OLL 340 provides an abstraction layer for manipulating servers and network devices, without requiring knowledge of the vendor-specific details of such resources. Furthermore, OLL 340 orchestrates operations, though the operations are device specific and on different devices. Server specific operations such as saving a server snapshot, startup, reboot, shutdown, software update, or remote access are done through ITAP agent. network device operations, such as modifying a VLAN membership on a switch, or adding a server to a load balancers to use Telnet or SSH.

OLL 340 provides session management, an important capability for users to establish a session with the business logic so as to perform a sequence of operations. OLL 340 ensures the consistency of the operations, as well as the orchestration required to ensure that the operations sequencing reflects the intended behavior. OLL 340 represents the entities that exist in the system's database, as objects that can be manipulated. OLL 340 is tasked with ensuring that the database entities are consistent with the objects inside of OLL 340, thus eliminating any inconsistencies that could arise if the actual device state as represented using such objects was different from the database state of the device. OLL 340 is also responsible for ensuring state transitions between different states of the devices under management, such as servers, switches, storage, load-balancers and the like.

OLL 340 provides such functionality by accessing one or more databases (represented by a database 345), one or more storage servers (represented by a storage server 350) and a number of services. Storage server 350 can serve, for example, as a snapshot repository (e.g., storing snapshots of operating systems (OSs) and associated information, applications and information regarding those applications, configuration information for target devices and the like). The aforementioned services include a device service 360, a DHCP boot service 361, an RPC service 362, an event service 363, a reverse address resolution protocol (RARP) service 364 and a proxy service 365. Also included in these services are a subnet service 370, a storage service 372 and a network service 374. These services communicate with resources such as target computing devices 315 and network devices 320 via protocol layer 325.

Figure 4:
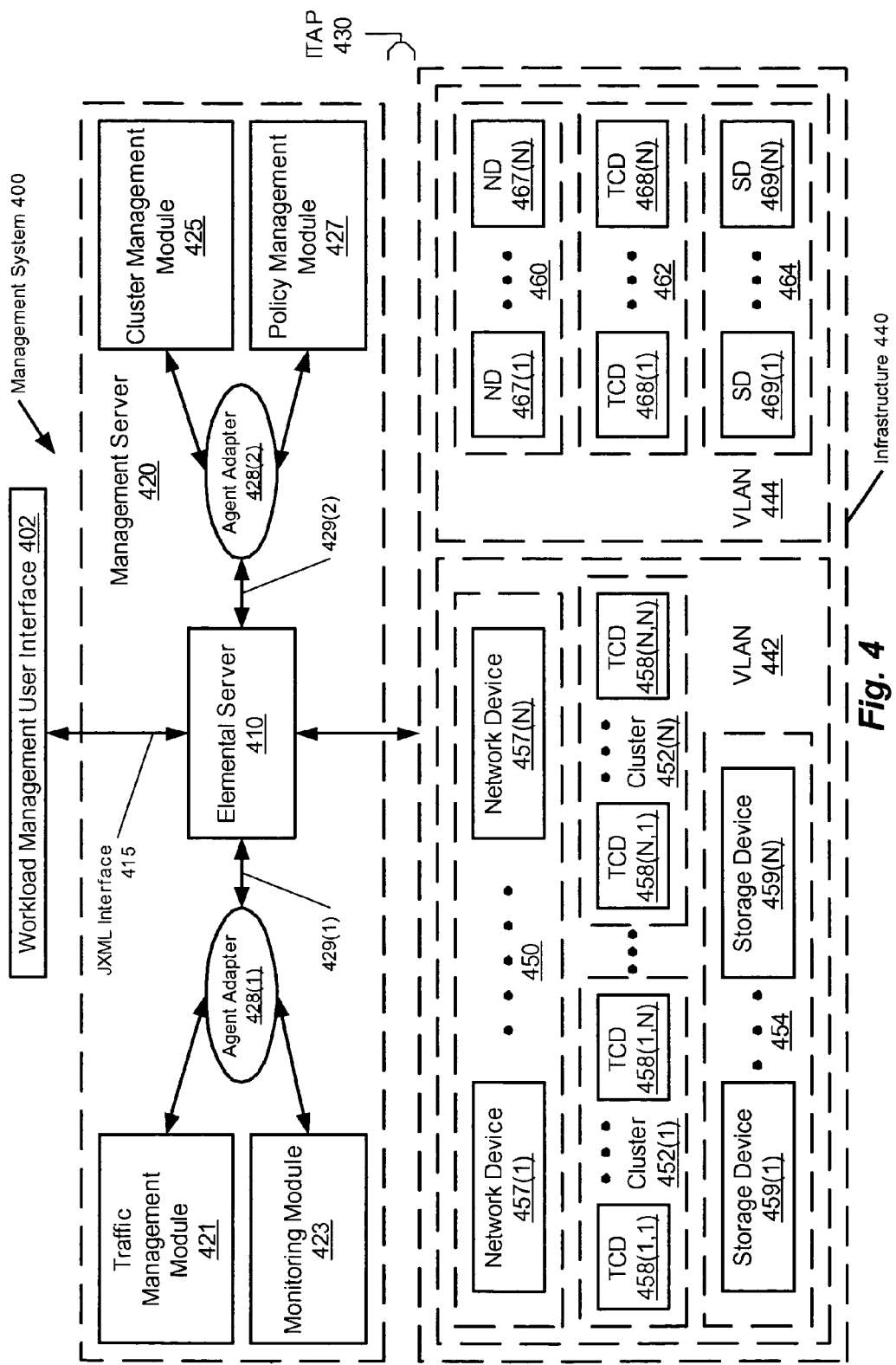
FIG. 4 is a block diagram illustrating a management system 400 according to the present invention.

FIG. 4 is a block diagram illustrating a management system 400 according to the present invention. FIG. 4 depicts management system 400 as including a workload management user interface 402 that communicates with an elemental server 410 via a JXML interface 415, a customized extended markup language (XML) including an applications program interface. JXML is the standardized XML-RPC based intermediate language and communication protocol used by client applications to communicate with elemental server 410. Management system 400 and elemental server 410 can expose all or a specific subset of resource models and management primitives to the outside world through JXML. The use of JXML provides for an architecture that provides ease of integration and extensibility. JXML is a communication language with a request-response protocol, as well as a full-featured applications programming interface (API) for applications to remotely invoke operations in management system 400 and elemental server 410. JXML has a set of data structures and APIs enabling the programming of management system 400 and elemental server 410. To make programming easier when using high-level languages, JXML data structures and APIs can be represented through a wrapper Java library, although this is not mandatory. This technique enables easy implementation of client-side applications, with an added benefit of reducing any concern having to do with the mechanics of XML generation or parsing.

In operation, client-side applications capture administrator requests for performing operations as a JXML request message to elemental server 410 and capture elemental server 410 responses as JXML response messages. These messages can then be authenticated and sent over an encrypted HTTP or TCP connection, for example. The use of JXML (or a comparable protocol) enables a loosely coupled client-server architecture resulting in a system that provides extensibility, scalability and interoperability. While the server used to perform many of the functions is referred to as an elemental server, it will be appreciated that other embodiments can use other hardware and software elements to achieve the functions described herein.

In addition to workload management user interface 402, elemental server 410 can communicate with any number of management, monitoring or other processes (modules), which are depicted in FIG. 4 as being included in management server 420. For example, in FIG. 4, elemental server 410 is depicted as communicating with a traffic management module 421, a host/network monitoring module 423, a cluster management module 425 and a policy management module 427. These modules can be executing with elemental server 410, as processes on one or more computing platforms. As will be appreciated, elemental server 410, as depicted in FIG. 4, includes the functions of a resource management module (e.g., resource management module 225).

Elemental server 410 communicates with the management processes via a secure transmission control protocol/internet protocol (TCP/IP), such as the IT Abstraction Protocol (ITAP) referred to earlier herein. Management processes allow automation of various management operations, such as discovery, control, provisioning, updating and metering, and the like. Note that other types of operations and functions can be included. An ITAP interface is a standard protocol that is designed as a problem-correction analogue of the simple network management protocol (SNMP).

Agent adapters can be used to allow the elemental server to communicate with the aforementioned management processes. For example, FIG. 4 depicts such agent adapters as agents 428(1) and 428(2), which use an ITAP interface (depicted in FIG. 4 as ITAP communication channels 429(1) and 429(2)). In the embodiment shown in FIG. 4, agents 428(1) and 428(2) are problem-correction analogues of problem-detecting SNMP agents. Agents adapters such as agents 428(1) and 428(2) operate as follows.

In order for external (third party) modules to communicate and interact with elemental server 410, agent adapters can be created as follows. Any external software module such as a traffic management module or a monitoring module can communicate directly with elemental server 410 using, for example, JXML. However, if the external software is unable to do so (e.g., the external software does not support JXML), the external software can use an agent adapter to translate its communication protocol (e.g., Simple Object Access Protocol (SOAP), Common Information Model (CIM)/extensible markup language (XML) or other structured protocol) into the JXML employed by elemental server 410 in this embodiment. Alternatively, if communication with an external software module (e.g., a cluster server or a load balancer) is desired, elemental server 410 uses ITAP as the mechanism for communicating. However, if an external software modules does not understand ITAP, which may often be the case, another agent adapter can be used to translate ITAP into the messaging protocol that the external software module recognizes (e.g., a protocol such as SNMP or UDP (user datagram protocol)). Finally, external software modules can also engage in bi-directional communication with elemental server 410 using the low-level ITAP protocol, for which again, agent adapters would enable the translation of protocols.

It will be noted that other embodiments can use any suitable communication protocols, methods, designs or approaches. Moreover, one or more of the components of the system of FIG. 4 can be omitted. For example, some embodiments need not use agents, but instead employ a different communication mechanism.

ITAP is used to describe and perform specific operations on managed server assets through an ITAP agent (e.g., agents 428(1) and 428(2)). An ITAP interface (layer) provides interfaces for elemental server 410 to communicate with agents that form a proxy to or reside on devices that the elemental server 410 manages (e.g., agents 428(1) and 428(2)). ITAP ensures secure communication between elemental server 410 and target devices (e.g., infrastructure components such as servers and switches). Being that ITAP is really a messaging protocol, the primary functions provided by ITAP (or comparable protocol) include providing a transport layer that ensures encryption, point-to-point communication, authentication, prevention of spoofing, application level routing, and input/output (I/O) streaming. The use of ITAP or a comparable protocol ensures that periodic communication between elemental server 410 and the target devices is reliable, secure, available and scalable.

When a target server is in a pre-boot state, that target server is discovered by elemental server 410 via the target server's network boot operation, subsequent to which elemental server 410 installs on this server a "pre-boot" agent, also known as an ITAP agent. The ITAP protocol then ensures encrypted communication between elemental server 410 and this ITAP agent. In the case of devices on which agents cannot be installed, such as network devices, elemental server 410 communicates with such devices via a proxy-ITAP agent.

When a target server is booted up with a host operating system (OS) that was provisioned either under management system 400 or otherwise, elemental server 410 can then install another ITAP agent, to ensure effective ITAP communication between elemental server 410 and the target server. The behavior of this "post-boot" ITAP agent is as follows. Such an ITAP agent is installed on the target server during post-boot configuration phase to allow one or more of the following operations to take place: maintenance of a constant heartbeat to elemental server 410, the deployment of one or more software packages, the updating and refreshing of hardware component discovery information, the provision of remote access support and/or the rebooting of the server asset.

In the embodiment shown in FIG. 4, the ITAP protocol (depicted in FIG. 4 as ITAP 430) is also used by elemental server 410 to communicate with an information technology infrastructure (depicted in FIG. 4 as an infrastructure 440). Infrastructure 440 can include a wide variety of hardware and software components, as indicated by the depiction of infrastructure 440 shown in FIG. 4. Such infrastructure components can include computing, networking and storage components, collectively referred to as "resources" or as a "computing fabric." These components are typically configurable, and responsive to signals that allow their configuration by elemental server 410. Groups of components managed as part of management system 400 can be organized into clusters, local area networks (LANs), virtual LANs (VLANs) and other aggregations of such resources, for example. By using a standardized protocol (e.g., ITAP) and interfaces (e.g., agent adapters), different (i.e., "heterogeneous") devices made by different manufacturers can be accommodated.

Such an infrastructure is exemplified in FIG. 4 by VLANs 442 and 444, which can be ones of a number of such VLANs. VLAN 442 includes a network device group 450, a number of clusters (depicted in FIG. 4 as clusters 452(1)-(N)) and a storage device group 454. Network device group 450 includes a number of network devices (depicted in FIG. 4 as network devices (NDs) 457(1)-(N)), which can be load balancers, switches, routers, or other such network devices, and will typically be a combination thereof. Each of clusters 452(1)-(N) includes a corresponding number of target computing devices (TCDs; depicted in FIG. 4 as target computing devices 458(1,1)-(N,N)), which communicate with one another, as well as with management server 420, by NDs 457(1)-(N). Also similarly, storage device group 454 includes a number of storage devices (depicted in FIG. 4 as storage devices (SDs) 459(1)-(N)). In one example, the resources of VLAN 442 are allocated to VLAN 442. In the scenario depicted in FIG. 4, the resources of VLAN 442 are fully configured and allocated. The resources of VLAN 444, by contrast, are unallocated (and, in fact, can be "bare metal" resources), and are available for allocation and configuration, as may be needed to maintain VLAN 444.

In the manner of VLAN 442, VLAN 444 also includes a network device group 460, a cluster 462 and a storage device group 464. Network device group 460 includes a number of network devices (NDs; depicted in FIG. 4 as network devices 467(1)-(N)). Similarly, cluster 462 include a number of target computing devices (TCDs; depicted in FIG. 4 as target computing devices 468(1)-(N)). Also similarly, storage device group 464 includes a number of storage devices (SDs; depicted in FIG. 4 as storage devices 469(1)-(N)). The foregoing infrastructure elements are managed by elemental server 410, and the other components of management server 420. Examples of the communication, control and configuration of such infrastructure components can be found in co-pending patent application Ser. No. 09/860,483 entitled "DYNAMIC COMPUTING ENVIRONMENT USING REMOTELY ALLOCABLE RESOURCES", filed on May 17, 2001, and having J. Bandhole, S. Nanja, W. Blume and C. Miyamoto as inventors; and co-pending patent application Ser. No. 10/066,324 entitled "DYNAMIC COMPUTING ENVIRONMENT USING REMOTELY ALLOCABLE RESOURCES", filed on Jan. 30, 2002, and having J. Bandhole, S. Nanja, W. Blume and C. Miyamoto as inventors, which are hereby included by reference herein, in their entirety and for all purposes.

Elemental server 410 acts as a central processor for coordinating interactivity among workload management user interface 402, management server 420 and infrastructure 440. Note that any number/manner of infrastructure components can be used and many different types of management server architectures can be similarly employed. The use of standardized protocols and interfaces to the three respective basic blocks of the system, the management user interface, management server and infrastructure components facilitate this advantage.

Disparate components can be monitored as to, for example, traffic, host performance, cluster management. Alerts or alarms based on use of resources, performance, etc., can be set and processed. The response to workload variance is automated by allowing the management engines and management application to receive infrastructure component information and to receive and use subsequent control commands from the engines and application to appropriately configure, allocate or otherwise control and manage the components.

For example, in cluster and application management it is desirable to allow servers to join or leave clusters depending on workload needs. For web-serving functions there may be a need to change the number of web servers for a site, page and the like, in order to balance the load demand of computers, users, employees, testers, designers, programmers and others accessing the pages. For traffic management it may be necessary to more a server from one VLAN to another. For host monitoring a faulty server may need to be replaced with another server. The replacement server typically will need to be pre-provisioned with required software (e.g., operating system, applications, communication configuration) in order to act as a functional replacement. For policy based management the infrastructure needs to respond to capacity planning and service level assurance needs. Load changes for any type of processing, storage or networking function can be alleviated by rapid response to add or remove resources from the subject processing.

Workload functions can be automated completely, or to a significant degree, by the use of the workload management system of the present invention. A preferred embodiment of the invention allows commissioning, de-commissioning and re-commissioning of resources. For example, load balancers, switches, applications, and other components can be unregistered from an IP address, node name, pool name and the like. Allocation of resources can be done automatically upon detecting of a pre-set criterion, an event, a situation or the like (and more generically, a condition), manually by a human operator, or by a combination of both. Conditions can include time-based, network traffic or communication density, processor utilization, memory utilization, and other such metrics. Servers can be removed from service and replaced without affecting others within the removed server's former cluster or pool.

The system allows remote and automatic capturing of information regarding infrastructure components from the so-called "bare metal", up through the infrastructure stack. Components, elements, characteristics, and portions of components, as well as other parts of the infrastructure and their associated characteristics, can be monitored, discovered and managed. Data on system performance including events, triggers and corrective actions can be logged or otherwise stored for later analysis or use.

The workflow inherent in workload resource management of the present invention for a three tier web architecture, in the manner of that shown in FIG. 4, typically entails a usage scenario in which dynamic scaling of a web-tier is accomplished by bringing up, and taking down, various web servers, to address (potentially unanticipated) spikes in the load placed on the IT resources under management. The load itself may be measured and monitored via a variety of observations, including those made by traffic management (load-balancers), seasonal load policies, and host monitoring (via SNMP and other monitoring agents).

Typically, the metrics used in managing a given resource are the resource's capacity, the load placed on the resource and the resource's priority (or that of the activity employing the resource). The capacity and load metrics are, as would be expected, based on the kind of resource under management. For example, a server's or storage unit's capacity and load could be measured in input/output (I/O) operations serviced/requested over a given period of time. Another example is the amount of storage available at a given time, in the case of storage units, memory and the like. Yet another example is a processor's processing capacity/load (e.g., percentage utilization). Many other examples will be apparent to one of skill in the art, in light of the present disclosure.

Once a resource's capacity and load are determined, the resource's priority is examined. In a situation in which load exceeds capacity, or does so for all practical purposes (e.g., the case in which allowing 100% usage nearly guarantees failure due to minor variations in load), a determination regarding which requests are to be serviced, and which are not, must be made. More than choosing between which requests are to be serviced first, a determination may also be needed with regard to the preemption of requests currently being serviced, if the incoming request is of sufficient priority.

Once these parameters are determined, a system of the present invention possesses the information needed to make a determination as to whether to take action. What is also required is a determination, once the determination to take action has been made, as to what action or actions are to be taken. Thus, for a given metric, in the case in which load exceeds capacity, the system must then make a determination as to how to proceed. Corrective actions taken in response to such situations can include provisioning new resources, migrating resources to shift capacity to the activity experiencing a heavy load, application tuning or some other corrective action.

For example, in response to measured increases in web server load, a system of the present invention commissions new web servers from a pool of IT resources that can include, for example, servers, software stacks, IP addresses, licenses, network elements, storage units and other such resources. The new web servers added are configured with the appropriate software stack in the appropriate subnet with the applicable IP addresses, after which the web server services on these new web servers are started. Subsequently, the system communicates with affected load balancer(s), indicating that the newly-allocated resources are now operational and ready to participate in an improved load-balancing network. Likewise, upon being notified of a decrease in workload on the web-tier, the system can de-commission and re-commission web servers and other resources, migrating the resources as necessary, in order to make the best use of the available resources, given the workloads currently being experienced by the IT resources under management. Numerous examples of such situations will be appreciated in light of the present disclosure.

In fact, the present invention can be deployed in a number of situations to addresses specific problems, including the following four scenarios. In the scaling of electronic businesses, a problem often encountered is the overloading of certain servers that serve popular content. Another problem is sustaining performance in the face of one or more failures. The is also the problem of maintaining (updating) servers that are in use in a production environment. Yet another problem encountered with some frequency is that of disasters, and the recovery of customized infrastructure.

The first example is sustaining performance (e.g., when serving popular web content). For example, in an electronic business infrastructure, a system of the present invention automates scaling actions and avoids increased TCO (total cost of ownership) by obviating the need for peak load sizing. In steady state, one or more load-balancers load-balance incoming traffic to web servers. A system of the present invention periodically collects server throughput and connection information from the load-balancer(s), and detects poor performance (e.g., in the case in which a surge in demand for popular public content occurs). Automatically, a system of the present invention triggers the removal of underused servers (e.g., from a customer content pool) and makes them available to the server pool serving the electronic business content requests (e.g., a public content pool). The system then re-commissions these available servers, re-provisioning entire software stack and customizing these servers to become public content servers. Finally, the system triggers the addition of these servers to the existing load-balancing scheme for the public content pool, thereby reaching a new steady state or equilibrium with more resources to serve public content to web users, but without the need for a greater total number of servers (i.e., the number of servers in both pools).

Another scenario is one in which system performance must be sustained in the face of one or more failures. In this case, the load-balancer(s) manage traffic across an infrastructure. A system of the present invention complements this activity with corrective actions, thereby avoiding costly performance degradation. For example, computer systems running mission critical applications may fail. A system of the present invention periodically interacts with the load-balancer(s) to detect failures. When a server becomes unavailable, the system triggers removal of servers from their current pool to make them available for use in the pool that has lost a server.

For example, as before, the system re-commissions these available servers. The system then re-provisions the entire software stack and customizes this server to take the role of failed server. Finally, the system triggers the addition of the server to the existing load-balancing scheme, for example, to an application server or database server pool. As a result, the business (e.g., its electronic commerce web site) is minimally affected: the business logic and database access continue to perform as expected even in the face of the server failure.

The third common problem addressed by a system of the present invention is performing maintenance when servers are in a production environment. Such a system automates such update actions, thereby minimizing the performance degradation typically encountered when performing such operations. For example, an e-mail server may need to be serviced. According to policies set by the responsible IT manager, the system triggers the removal of the affected server, in order to make that server available for maintenance. Subsequently, the system provisions a new application (new version of the e-mail server software) on the e-mail server, updates the e-mail server's existing software with a software package (service pack), or performs some other appropriate operation. Finally, the system triggers the addition of the now-updated e-mail server to return the e-mail server to its pool, restoring the environment. The infrastructure is now ready for the next server (or set of servers) to be taken out of service for maintenance.

The last example is disaster recovery. Disaster recovery requires automating tasks that enable a secondary site to take the entire load from a primary site. Before a disaster occurs, a system of the present invention can automatically distribute snapshots from the primary site to the secondary site. In the event of a disaster, the system can then restore the complete configuration to either the secondary site, thereby allowing for quick recovery.

A benefit of the present invention is the "end-to-end" automation of the decisions affecting and actions taken with regard to system control, provisioning, updating and other such tasks, that a system of the present invention can provide. The following describes the workflow issues involved in creating an end-to-end workload management solution. A system of the present invention achieves this by determining the resource topology of the resources being managed. The resources under workload management can be categorized as physical resources and logical grouping of resources, for example. Physical resources that can be managed include network elements (e.g., switches, routers, load-balancers and the like), servers (e.g., blade servers, standard servers and the like), software applications, glue resources (e.g., IP addresses, licenses and the like) and other such IT resources. Moreover, a system of the present invention is capable of managing aggregations of such resources. These logical groupings of resources include active networks of servers, standby free pools of servers, clusters (storage, computing or other clusters) and other such aggregations of IT resources.

A system of the present invention is capable of performing load detection in a number of ways. Table 1 describes examples of the kinds of events that can be detected by various observation techniques:

TABLE 1

Examples of events that can be detected.

| Event | Load Metric | Trigger Mechanism |
| --- | --- | --- |
| Web-Server/Web-tier is loaded | CPU, Memory, . . . thresholds | Host Monitoring: via agents |
| Web-Server is not responding as expected | Ping, SNMP Event | Host Monitoring: SNMP Trap |
| Web-Server I/O or session traffic is loaded | I/O congestion | Traffic Monitoring |
| Seasonal demand | Date/Business-Policy | Policy and Scheduler Engine |

Having observed an event, a system of the present invention is then able to take one or more actions in response thereto. Table 2 provides examples of the actions that can be taken upon the observation of an event, the receipt of an event notification or the like:

TABLE 2

Examples of actions that can be taken.

| Event Category | Corrective Actions |
| --- | --- |
| Specific web-server isn't responding (Host Monitoring: SNMP trap/alert, monitoring agents) | Restart of services or reinstallation of applications Commission a new server with the requisite software stack and network settings in the same network tier (e.g., subnet) as the failed server Inform load-balancer about the new server. Update network topology |
| Web-server/Web-tier I/O is loaded (Traffic Monitoring). Trigger on high-water mark. Indicate need to commission one or more new servers with a specific software stack | Commission new server(s) from a common pool from bare-metal with a specific software stack. Assign new IP addresses to servers, install and startup newly-installed web-servers Inform the load-balancer of the new IP addresses in which to balance the load and update the network topology and resource pools Trigger metering/billing events |
| Policy and Scheduling engine triggers on a seasonal demand for web-servers | Same as above |
| Peak demand has subsided | De-commission servers; wipe-clean; return servers to common pool; Inform Load-balancer Trigger metering/billing events |

An Example of the Operation of a Management System of the Present Invention

Figure 5A:
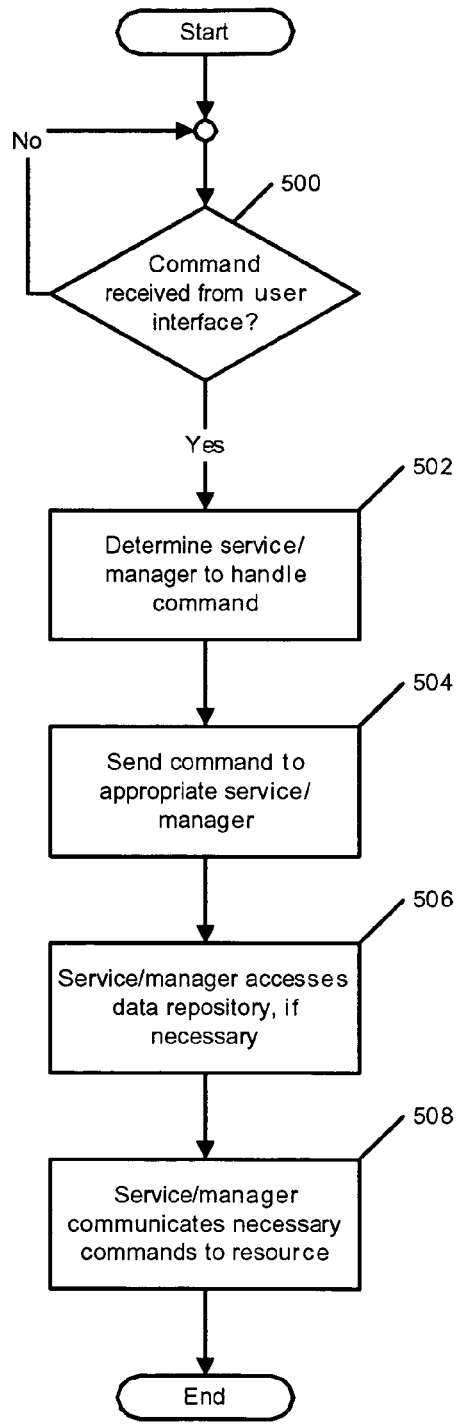
FIG. 5A is a flow diagram illustrating a process of configuring resources using a management system of the present invention.

FIG. 5A is a flow diagram illustrating a process of manually configuring resources using a management system of the present invention. The process begins with the management system awaiting receipt of a command from the user interface (step 500). Once such a command is received, the management system determines which service/manager is the appropriate one to handle command (step 502). Next, the management system sends the command to the appropriate service/manager (step 504). The given service/manager then accesses the data repository, if necessary (step 506). Once the requisite information, if any, has been retrieved, the service/manager communicates necessary commands (and potentially, information) to the appropriate resource (step 508).

Figure 5B:
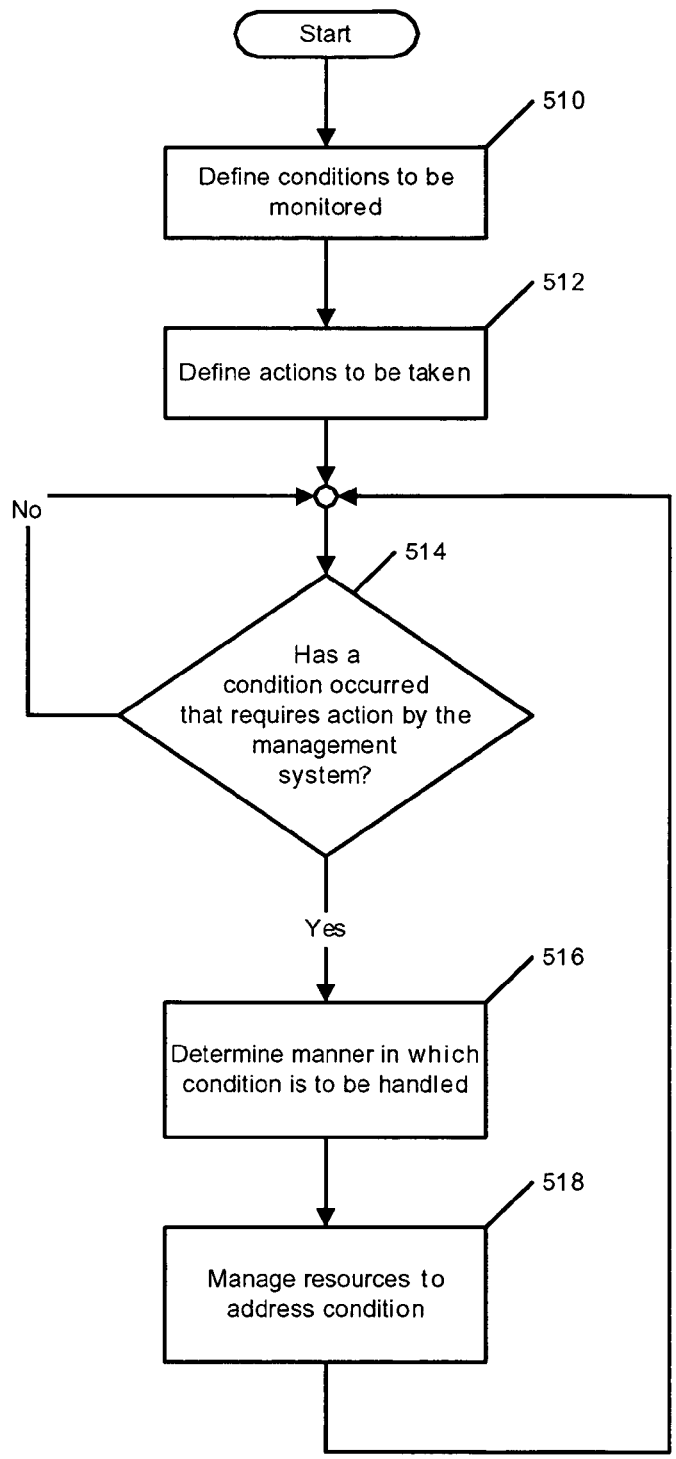
FIG. 5B is a flow diagram illustrating an overall process performed by a management system of the present invention.
Figure 5C:
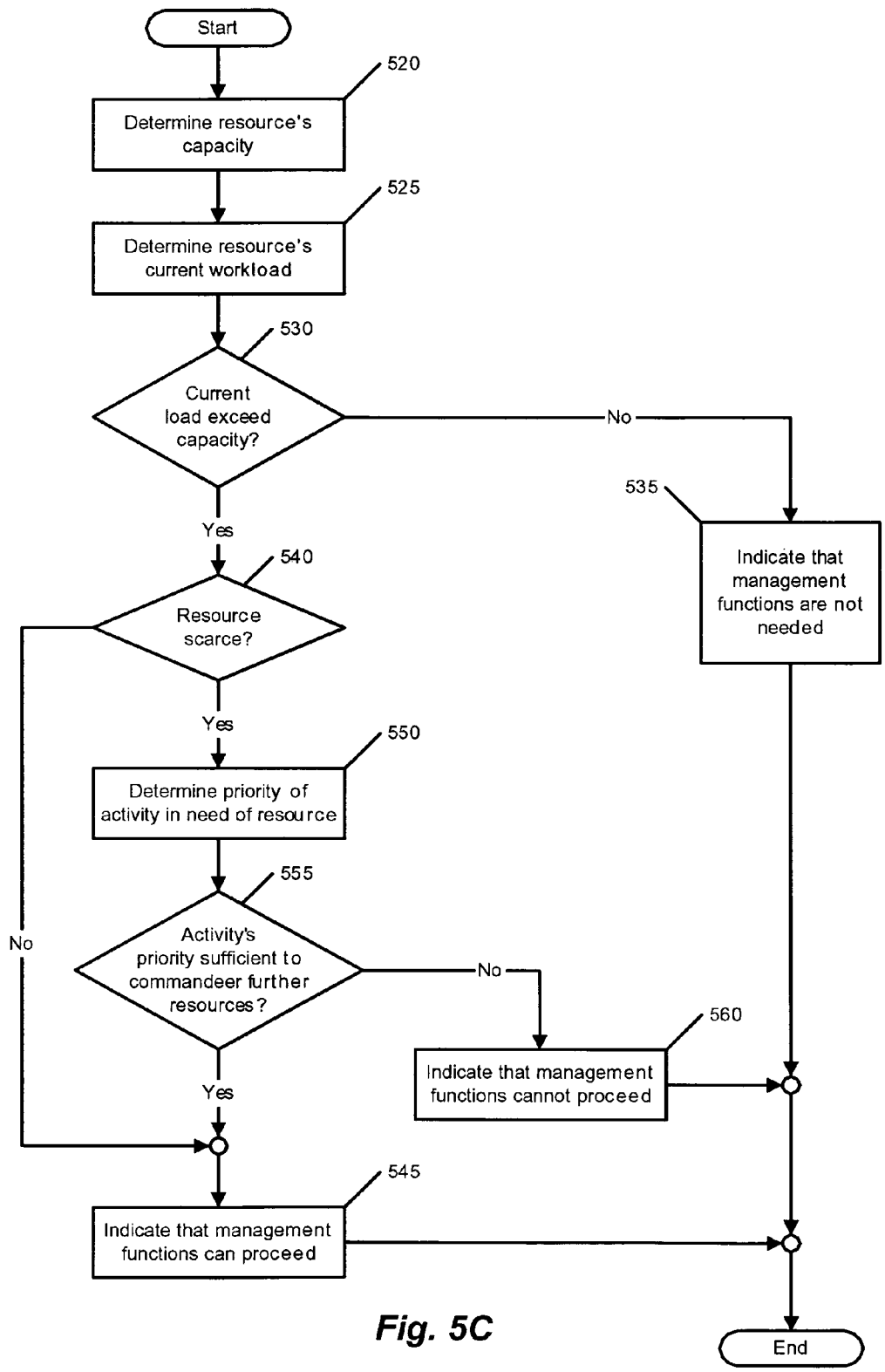
FIG. 5C is a flow diagram illustrating an example of a process performed by a management system of the present invention.

It will be noted that various processes according to embodiments of the present invention are discussed herein (e.g., with reference to FIGS. 5A, 5B and 5C). It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

These operations may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

The software modules described herein may be received by a computer system, for example, from computer readable media. The computer readable media may be permanently, removably or remotely coupled to the computer system. Such computer readable media can include, for example: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media can be used to store and/or transmit the software modules discussed herein.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like. Each of the processes described herein can be executed by a module (e.g., a software module) or a portion of a module or a computer system user using, for example, a computer system such as that discussed subsequently in connection with FIG. 9.

FIG. 5B is a flow diagram illustrating an overall process performed by a management system of the present invention in automatically configuring (and reconfiguring) resources. The process begins with the definition of conditions (e.g., events in the infrastructure being monitored) that are to be monitored by the management system (step 510). Actions that can be taken can also be defined (step 512).

As will be appreciated, while it need not be the case, the actions thus defined can be specific to events, situations or other conditions. One strength of an approach according to the present invention is its ability to deal with both actions that are condition-specific, as well as actions that are condition-neutral. The actions themselves can be simple, or can be more complicated. For example, the condition in question might be excessive traffic on a load-balanced tier. The response in such a situation can be the migrating of software, changing session persistence parameters, and (potentially) even changing the load-balancing algorithm employed. Moreover, if all of these actions fail to address the situation, the system can provision another server (with the same software stack as the servers on that load-balanced tier), configure the network settings on the server (in order to place the new server on the same load-balanced network). The system then informs the load-balancer of the newly-provisioned server and starts certain of the services on the newly-provisioned server.

Alternatively, such actions need not be pre-defined for a given condition. In such a scenario, the management system makes a determination as to the condition at hand, and can then use any one of a number of techniques to decide upon a course of action. For example, the management system may base such a decision on historical information (e.g., actions taken previously, and their results). In doing so, artificial intelligence techniques (such as the use of heuristics), fuzzy logic techniques and other such techniques can be used to arrive at some relatively optimal solution to the given condition. By using such techniques, a management system of the present invention is able to "learn" from past situations, and so provide increasingly better solutions to the workload management situations that occur in a given computing infrastructure.

Once these conditions and actions are defined, the management system then awaits the occurrence of one of the conditions thus defined (step 514). As noted earlier, such a condition can be any situation in which an action should be taken by the management system, such as a defined capacity being exceeded by a current load. This monitoring can be performed, for example, by traffic management module 215, monitoring module 220 or detection module 285 of resource management module 225. Once such a condition exists (e.g., a defined event occurs), the management system determines the manner in which the condition should be handled, which may include reference to the actions defined earlier (step 516). Such functions can be handled, for example, by decision module 290 of resource management module 225, cluster management module 230 or policy management module 235. Next, the management system manages the IT resources under its control, in order to address the needs of the system under management, in light of the condition (step 518). Such actions can be taken, for example, by traffic management module 215, implementation automation module 295 of resource management module 225, cluster management module 230 or policy management module 235.

FIG. 5C is a flow diagram illustrating an example of a process performed by a management system of the present invention, in which the management system automatically determines, in response to a resource's capacity being exceeded by a load on that resource, whether configuration (or reconfiguration) of one or more resources can be performed. In this example, a resource (having a capacity) is in service, and is undergoing a load of some type. The management system needs to determine if configuration/reconfiguration is necessary, and whether that can actually occur, given the priorities and resources available to the system under management.

The process begins with a determination by the management system as to a resource's capacity (step 520). The management system also makes a determination as to the resource's current workload (the current load being placed on the resource) (step 525). If the load placed on the resource does not exceed the resource's capacity (step 530), an indication is made that no actions on the part of the management system are needed (step 535).

If, however, the load placed on the resource exceeds the resource's capacity (step 530), a determination is made as to constraints on the resource's availability (the scarcity of the resource) (step 540). This translates into a determination as to whether enough of the given resource exist within the system under management, to allow the management system to re-allocate resources to meet the existing needs. If the resource in question is not scarce, an indication is made that management functions (e.g., the re-allocation of resources) can proceed (step 545), and the process concludes. As will be apparent from FIG. 5B, this conclusion is merely the conclusion of a single iteration with regard to the given resource, as monitoring and taking action is typically an ongoing process within a management system of the present invention.

If it is determined that the resource in question is scarce (step 540), a determination is then made as to the priority of the activity in need of the resource (i.e., the activity placing a load on the resource) (step 550). If the activity's priority is insufficient to commandeer further resources, an indication is made that management functions cannot proceed (step 560), and the process concludes. Otherwise, if the activity's priority is sufficient to commandeer further resources, an indication is made that management functions (e.g., the re-allocation of resources) can proceed (step 545), and the process concludes.

In this manner, the need for resource allocation and re-allocation is monitored, allowing a management system of the present invention to respond to the changing workloads placed on the system under management. As noted, such a management system can be configured to use artificial intelligence, fuzzy logic and similar techniques, to allow such a management system to "learn" appropriate responses to various situations, by monitoring the results of the allocation/re-allocation decisions made by the management system, and determining the desirability of the given outcomes.

An Example Architecture of the Present Invention

The present invention allows fast, efficient selection and configuration of processing networks, which can then be accessed and managed remotely. The processing network is referred to as a system including "resources." According to the present invention, the resources for such a processing network are fully selectable and allocable by a system architect, who is able to design a system by allocating resources and specifying how the resources are to be used. The system architect can be an individual, corporate entity, etc. The system is referred to as an "environment"—or more specifically as a "computing environment" and the primary provider of such an environment is referred to as an Environment Service Provider (ESP). In one embodiment, a typical system architect is the customer of the ESP, while the ESP provides the resources and the tools to easily select, allocate, configure and operate the environment.

The present invention allows fast allocation and configuration of resources such that different environments can be quickly created from the same resources. This allows "time sharing" of overall resources so that a first environment can be "live" (operative) for a time period defined by the system architect (e.g., a daily two-hour slot), followed by second, third and fourth environments being instantly created for the next four hours for three different customers, and so on. After a time period expires, such environments might either manually or automatically de allocate such resources. Since these "computing environments" can be dynamically configured and re-configured out of the same set of resources, such an environment can also be referred to as a "Dynamic Computing Environment" (DCE).

One embodiment allows customers to create a computing environment from a remotely accessible user interface such as a web page. Thus, the customer can create, modify and operate the environment from anywhere in the world. Since the resources, in turn, can communicate over networks, including the Internet, this approach eliminates the cost of shipping hardware and software. Hardware and software designers, programmers, testers or other personnel using an environment according to the present invention can, similarly, access a DCE of the present invention from any location.

The creation of a DCE can be made automatic, and in fact, such an environment can be created and destroyed, and even re-created, automatically, without human intervention in effecting each such operation. When employing the present invention (and unlike the conventional computing infrastructure), there is no need to physically couple (or de couple) physical machines or resources to one another, upon those resources being added to or removed from a DCE. There is no need to manually configure Internet Protocol (IP) addresses or other network settings, or install operating systems and associated application programs on one or more physical machines. All such activities can be performed automatically without user intervention when using a DCE of the present invention.

According to the present invention, the DCE is a virtual computing system including a network including a number of distinct types of machines and a network connecting them. The present invention enables the separation of the activity of designing a DCE, from the activity of actually creating the DCE. Designing a DCE includes selecting the specific hardware, selecting the operating systems or other software, selecting the specific interconnections and the like. Creating a DCE includes allocating the resources, installing the operating systems and other software and performing other such tasks. Furthermore, the present invention automates the process of creating the DCE. A DCE for which resources have not been allocated yet will also be referred to as a virtual computing environment. Similarly, a computing device (or a subnet) that is part of a DCE also be referred to as a virtual computing device (or a virtual subnet).

The present invention provides a framework that enables configuring, provisioning, accessing and managing DCEs remotely. Configuring a DCE involves choosing the resources and their interconnections. The present invention supports operations for making such design choices through appropriate programmable interfaces. The interfaces can be used interactively through a graphical user interface such as a web page or non-interactively through a program script. Provisioning a DCE involves allocation of physical resources required for a DCE to function. The present invention manages the physical resources needed for provisioning DCEs and supports operations for allocating/de-allocating these resources. Accessing a DCE involves accessing one or more devices and/or sub-networks within the DCE. The present invention supports operations for accessing the components of a DCE. For instance, when a user needs to copy data from a specific computer to a backup storage device, operations involving "read" access to the computer and its local storage, "write" access to the storage device, and access to the network for transmitting the data will be used by the present invention to meet the user's needs. Managing a DCE involves managing the components of a DCE, such as a personal computer, a network router and other such components.

In one embodiment of the present invention, a system providing a framework for administering DCEs is implemented as a distributed system consisting of different software programs running on different computers and networking hardware. Administering DCEs, as described herein, refers to the configuring, provisioning, accessing, and managing of dynamic computing environments. In a further embodiment, the present invention permits "virtual" hosting of dynamic computing environments. As used herein, the term "virtual" specifies that neither the requisite devices nor the network need to be physically accessible to users. Further, in accordance with this embodiment, the hosting process may be initiated or terminated by users at will, from any geographic location. Thus the administrative framework allows users to remotely configure, provision, access, and manage DCEs.

Figure 6:
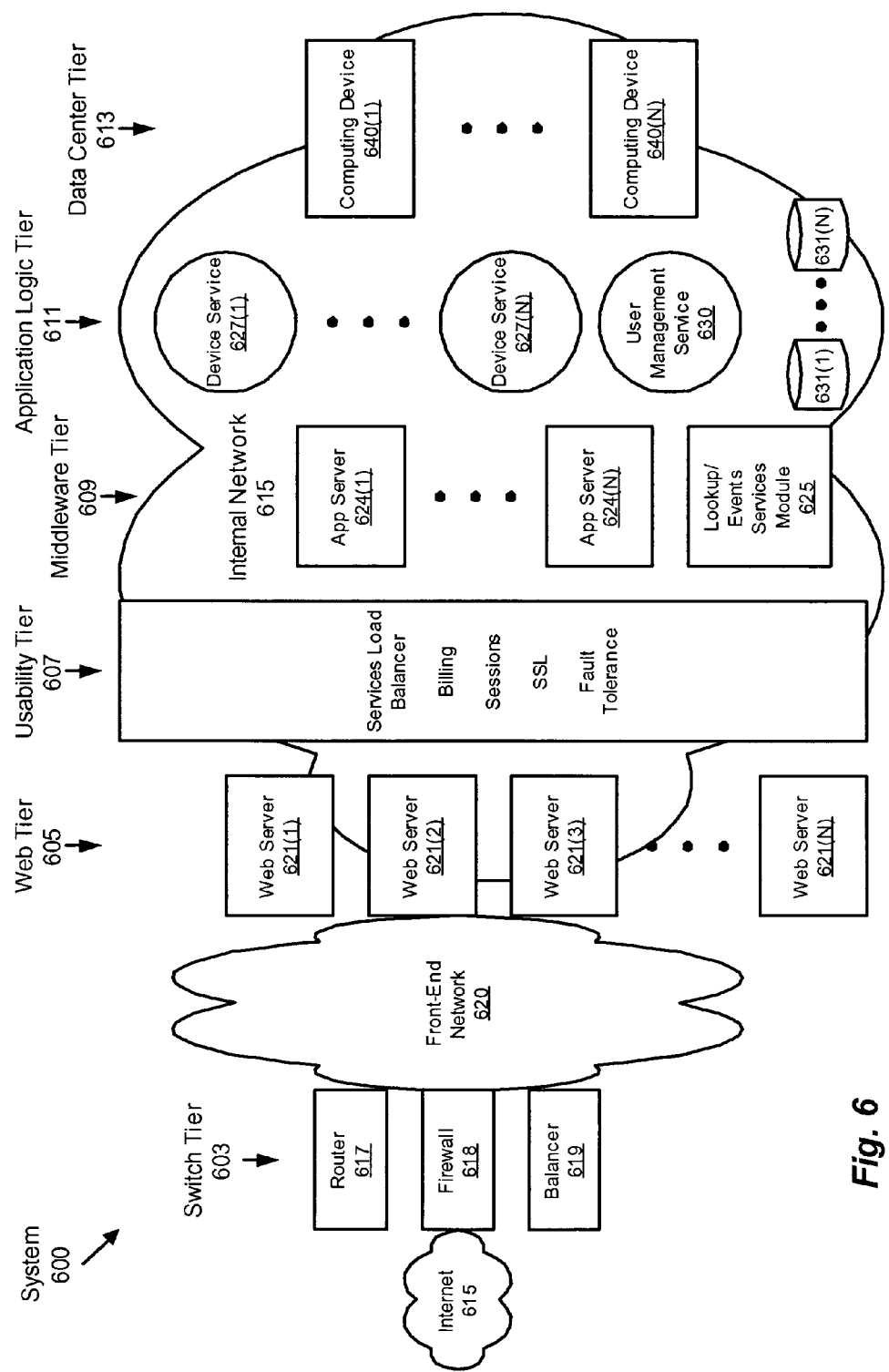
FIG. 6 is a block diagram illustrating a multi-tier structure of a system for hosting one or more DCEs according to the present invention.

FIG. 6 is a block diagram illustrating a multi-tier structure of a system 600 for hosting one or more DCEs according to the present invention. In FIG. 6, system 600 includes a number of tiers, namely a switch tier 603, a web tier 605, a usability tier 607, a middleware tier 609, an application logic tier 611 and a data center tier 613. These tiers can be implemented using software and/or hardware. As can be seen in FIG. 6, web tier 605, usability tier 607, middleware tier 609, application logic tier 611 and data center tier 613 are coupled to one another by an internal network 614.

Switch tier 603 is coupled to an internet 615 (e.g., the Internet), and includes a router 617, a firewall 618 and a load balancer 619. Load balancer 619 balances the load on web tier 605, and ensures that each of the web servers in web tier 605 receives roughly equal amounts of load, and if one of the web servers goes down (i.e., becomes inoperable), that the traffic is routed to other web servers in web tier 605. Router 617 routes data packets from internet 615, through the front-end and internal networks of system 600, as discussed subsequently.

Load balancer 619 can perform load balancing using IP packet-based load-balancing. One of skill in the art will appreciate that other load balancing schemes can be employed with equal success, and without affecting the nature of switch tier 603 or any other of the tiers of system 600. Router 617 can be any suitable router, or an equivalent device that provides substantially similar functionality. Web tier 605 is coupled to router 617, firewall 618 and load balancer 619 by a front-end network 620. Web tier 605 includes one or more web servers 621(1)-(N), which are coupled to usability tier 607 by internal network 614. Usability tier 607 provides various services including load balancing (for the application servers, discussed subsequently), billing, session management, security (e.g., via Secure Socket Layer (SSL)), and fault tolerance.

Middleware tier 609 contains one or more application servers 622(1)-(N) and a lookup/events services module 625 for implementing lookup of events and services. The primary functionality of middleware tier 609 is to delegate requests to specific services that are responsible for specific actions. For instance, these actions can involve accessing a database, accessing storage, accessing a computing device or the like. The processes running on application servers 624(1)-(N) make such delegation decisions and are further illustrated in FIG. 7.

Since one or more of the services in application logic tier 611 can be replicated, and running on independent physical computing devices, the services in application logic tier 611 need to be "looked up" for availability. Using a lookup service such as that provided by lookup/events services module 625, allows the services in application logic tier 611 to be started or shut down asynchronously. That is, the starting or shutting down the services represented by application logic tier 611 need not be synchronized with the processes on application servers 624(1)-(N). For instance, increasing the number of computing devices—as represented by capacity devices in data center tier 613—can require increasing the number of computing device services. This can be done without the knowledge of application servers 624(1)-(N) by automatically replicating the computing device services and notifying the lookup service (lookup/events services module 625). In addition, the services in application logic tier 611 can notify events (such as a storage unit is full, there are no more computing devices available or the like) to application servers 624(1)-(N). Such notification can be done through the lookup/events services provided by lookup/events services module 625. Lookup/Event services can be provided through a software layer such as Jini software, from Sun Microsystems of Santa Clara, Calif., for example. Of course, other implementations of the lookup/events services using other mechanisms are possible.

Application logic tier 611 provides a variety of operating systems device services, depicted as device services 627(1)-(N), and a user management service 630. Device services 627(1)-(N) are responsible for managing physical devices available in data center tier 613. User management service 630 is implemented within application logic tier 611, and establishes and maintains each user's configured virtual machines within a DCE. Such information is stored in one of databases associated with the application logic tier 611 (e.g., databases 631(1)-(N)).

Data center tier 613 includes various operating system platforms and processors (depicted as computing devices 640(1)-(N)). Computing devices 640(1)-(N) are selectable by the user, and so allow the user to select, for example, the computing hardware and operating system to be employed. Data center tier 613 also includes networking and storage resources, as well (not shown).

Figure 7:
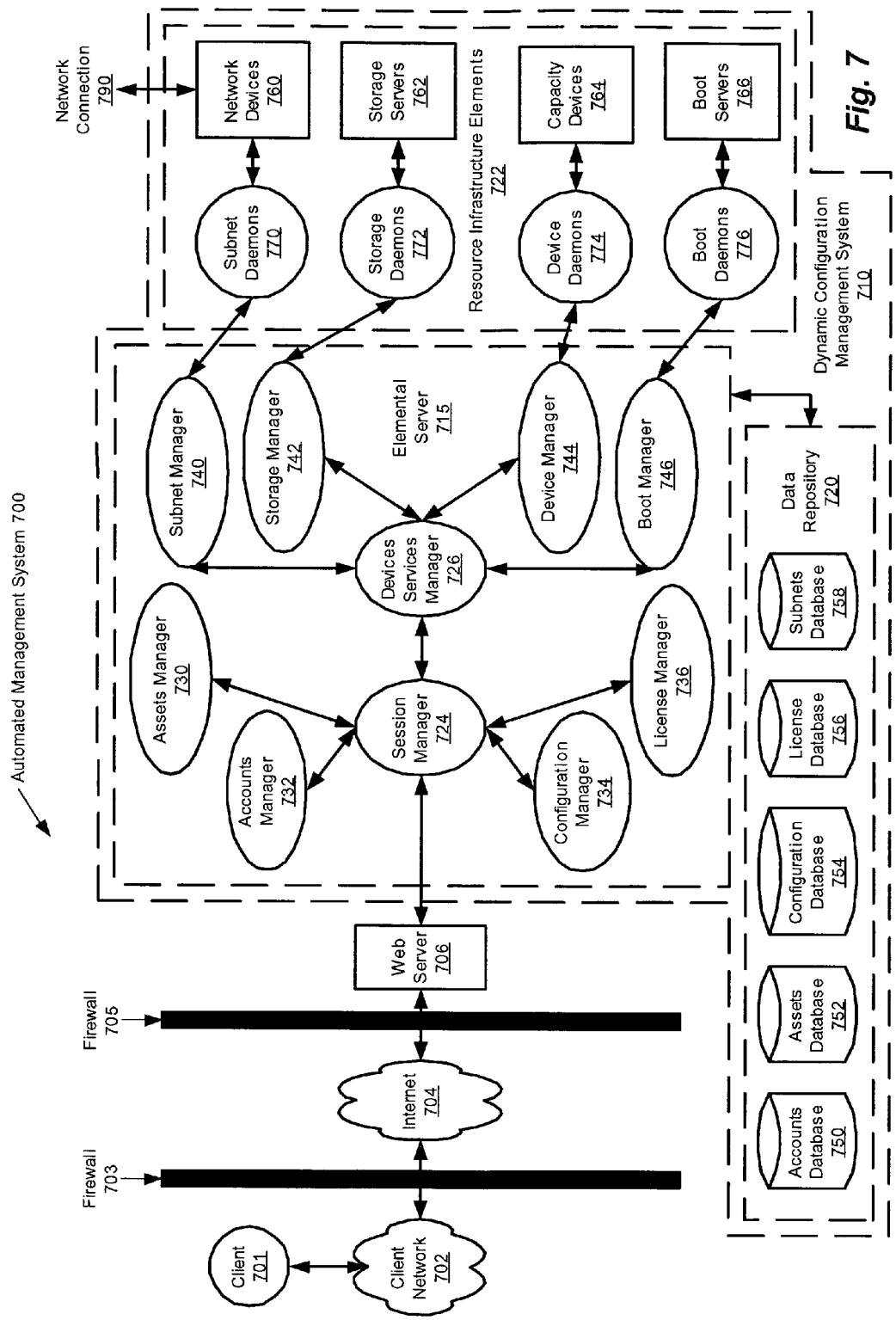
FIG. 7 is a block diagram illustrating an automated management system of the present invention.

FIG. 7 is a block diagram illustrating an automated management system 700 of the present invention. Automated management system 700 is configured to host and administer a dynamic computing environment. FIG. 7 shows a component view of the architecture of automated management system 700, rather than the layered view shown in FIG. 6. As shown, automated management system 700 includes a client 701, communicatively coupled through a client network 702 and a firewall 703, to an internet 704 (e.g., the Internet). From internet 704, client 702 is coupled through another firewall (a firewall 705) to a web server 706. Web server 706 interfaces firewall 705 (and so. internet 704) to a dynamic configuration management system 710.

Thus, as shown, client 701 accesses dynamic configuration management system 710 by accessing web server 706 (via client network 702 and internet 704). Moreover, although optional, web server 706 is depicted as providing a web based interface for realizing such communications. As will also be appreciated, although only one client 701 is shown, it will be understood that dynamic configuration management system 710 is capable of supporting any number of clients.

In FIG. 7, firewalls 703 and 705 maintain security within client network 702 and dynamic configuration management system 710, respectively, preventing unwanted access to either network. As noted, a web server 706 is coupled between internet 704 and dynamic configuration management system 710 in the exemplary configuration shown in FIG. 7. In the exemplary configuration shown in FIG. 7, dynamic configuration management system 710 includes an application server 715 and a data repository 720. Dynamic configuration management system 710 is used to manage resource infrastructure elements 722. Such functionalities are accomplished, at least in part, through communication with a session manager 724. In one embodiment, the communication with session manager 724 employs XML (extensible markup language), although one of skill in the art will appreciate that other such languages can be employed with equal success.

Web server 706 is compatible with commercially-available web server hardware/software, and supports Java Servlets and JSP (Java server pages). The JSPs of web server 706 (not shown) coordinate with the servlets of web server 706 (not shown) in order to generate the user interfaces presented to the user. Although the user interfaces receive information (e.g., commands to open windows or to shut down machines), they may display information such as account and user information, machine configuration information, acknowledgments, error and state information, for example. Web server 706 uses the servlets and the JSP pages to receive requests from a web client, such as a browser, and forward such requests to the application server 715, and then to return the results from application server 715 to the client 701. As noted, web server 706 communicates with application server 715, for example, using an XML based interface programming language. This language provides for the separation of the functionality of the system from the presentation aspects of the system as viewed by a user at the user interface of the client 701. One of skill in the art will appreciate the use of XML, or other suitable languages, to practice the present invention.

The connection between client 701 and web server 706 can be, for example, a secured or an unsecured connection. For instance, such a connection can use the Secure Socket Layer (SSL) protocol to ensure security of the data transmission between client 701 and web server 706. However, a secure connection is not mandatory. For example, if an embodiment of the invention were to be used inside the secure boundaries of an organization, then a secure connection would be redundant. In this context, a secure boundary includes a close network that is not accessible to public networks (e.g., a LAN that is internal to an enterprise).

Exemplary web server 706 can, in fact, be implemented using multiple web servers (in the manner of web server 706) for providing a number of clients such as clients 701 with access to one or more dynamic computing environments (DCEs). In another embodiment, web server 706 can be removed from automated management system 700 and if necessary, replaced with a proprietary user interface. For example, a third party provider, such as a data center, need not require a web server to provide access to or use of dynamic configuration management system 710. An example of such a proprietary user interface is a native application on client computer 701, which facilitates user interaction with dynamic configuration management system 710 using program scripts.

According to one embodiment of the present invention, as noted, dynamic configuration management system 710 includes application server 715, data repository 720, and resource infrastructure elements 722. Application server 715 operates to present to a user (e.g., at client 701) methods to create a DCE, methods to allocate physical resources required for a DCE, and methods to manage and to interact with a DCE, as well as its constituent components. Resource infrastructure elements 722 provide the physical resources, such as computing devices, storage devices and the like, as well as their control processes, which include operating systems, storage management software and the like. In one embodiment of dynamic configuration management system 710, application server 715, data repository 720, and resource infrastructure elements 722 reside in a single network. Alternatively, application server 715, data repository 720, and resource infrastructure elements 722 can reside in separate networks. In one embodiment of the present invention, application server 715 includes a session manager 724 and a device services manager 726.

In such an embodiment, application server 715 also includes an assets manager 730, an accounts manager 732, a configuration manager 734, a license manager 736, a subnet manager 740, a storage manager 742, a device manager 744 and a boot manager 746. Although not shown, one of skill in the art will understand that each of the aforementioned features are operably disposed in one or more servers within a distributed environment. That is, each of the managers need not reside in a single application server (e.g., application server 715), but rather can be operably disposed among two or more machines. Also, more than one application server can be used in the implementation of dynamic configuration management system 710.

Application server 715, for example, can be implemented using hardware and software that supports Enterprise Java Beans (EJB) and Java Database Connectivity (JDBC). As a further example, the various management elements of application server 715 can be configured to operate as EJB components for handling specific aspects of the functionality of dynamic configuration management system 710. It will be understood that any other suitable software, whether commercially available or proprietary, can also be used in place or in conjunction with the EJB server hardware and software used to implement application server 715.

Session manager 724 is configured to operate as an intermediary between client 701 and the various management elements of application server 715. Exemplary session manager 724 is configured to communicate with each of these management elements and other components within application server 715, and to operate to manage each session for each of client 701. A session is the period of time from the user logging in to the user logging out, for a given user under a give account. In one embodiment, session manager 724 functions to route requests from client 701 to the appropriate one of the various management elements of application server 715, in order to cause the requisite management element to perform the requested task. Session manager 724 can use, for example, a Java session bean to handle client requests. A "bean" as described herein refers to a component, which is a reusable program building block that can be combined with other components in the same or other computers in a distributed network to form an application.

Not only can session manager 715 coordinate the flow of information communicated between web server 706 and application server 715, session manager 715 can monitor and archive the activities of each of the users at client 701 for any given session. The session manager also handles verification of the user's capabilities to perform any given action. For example, session manager 724 can coordinate information related to the user, the capabilities of the user, machine configurations associated with the user's account, as well as commands to open windows on machines or to shut down machines. Although information flowing from session manager 715 includes configuration state information, acknowledgments, errors and the like, a typical implementation of session manager 724 performs little or no computations and has no state.

Accounts manager 732, which is also referred to herein as a user manager, is configured to communicate with session manager 724 and operates to create, maintain and remove all user account information specific to each user at one or more clients 701. Such information can include, for example, a user's login name, password, user name, email address and the authorized activities for each of the users. It will be apparent to one of skill in the art that such information can be stored in any appropriate data structure known in the art, and furthermore, any additional information fields can be added to a user account as proves necessary.

License manager 736 is configured to communicate with the session manager 724 and operates to create, maintain and remove the licenses associated with each of the activated operating system and application used by dynamic configuration management system 710. For example, each operating system has a maximum number of licensed uses associated with it and the license manager 736 prevents the system and its administrative framework from allocating licenses exceeding this maximum number. Each license as managed by license manager 736 is represented by data implemented as an entity bean, for example.

Assets manager 730 is configured to communicate with the session manager 724 and operates to create, maintain and remove a data structure including data representing the information regarding the physical resources that are part of resource infrastructure elements 722. Assets manager 730 monitors the use and assignment of soft assets, such as interne protocol (IP) addresses, operating systems (by license) and application software (by license), to hard assets, such as computers and network/sub network switches without handling or assigning assets directly.

In one embodiment, assets manager 730 receives information from the session manager 724 based on actions performed by a user at client 701, or by events which were triggered by such actions. An example of such an event is the assignment of a user to a computer (i.e., computer identification (ID) number) from the pool of resource infrastructure elements 722. Session manager 724 conveys such information to assets manager 730, and assets manager 730 responds by reserving such a computer and removing its ID from the pool of available computing resources. Another example of an event is the closing of the association of a user with a client (e.g., client 701), at which time the computer IDs associated with such an account are released, such that the computer IDs (and so the computers) are added to the pool of available assets. Session manager 724 thereafter requests that account manager 732 remove the corresponding account information.

Configuration manager 734 is configured to communicate with session manager 724 and operates to create, maintain and remove a data structure representing the information regarding one or more DCEs currently administered by dynamic configuration management system 710. Some of the DCEs may be virtual (e.g., physical resources required for a DCE may not have yet been allocated). For each DCE, configuration manager 734 also maintains each DCE's network configuration and the configuration of each virtual machine in that DCE with respect to its operating system and application software associated with the virtual machine. Configuration manager 734 also creates/removes the configuration information when a DCE is created/removed by the user.

For example, if a user at client 701 creates a DCE including two computers coupled to several high capacity storage devices, configuration manager 734 creates a database entry to store the physical computer TDs associated with the virtual computing resources and the storage device IDs associated with the virtual storage device or devices. The DCE, for example, is represented as a virtual sub-network, or subnet, and is associated with a collection of disjoint root subnets and nested subnets, which include the virtual machines and storage devices. Although the virtual subnet presented to the user at client 701 is a collection of virtual computing devices (e.g., virtual machines, computer devices, storage devices or any other allocable device or resource in the DCE) under a single virtual subnet, each of the physical machines and storage devices need not be associated with a physical switch, as is the case in typical subnets used in conventional computing environments.

Device services manager 726 functions as an intermediary, between session manager 724 and resource infrastructure elements 722. Device services manager 726 is configured to communicate with various managers, such as subnet manager 740, storage manager 742, device manager 744, and boot manager 746. Such managers are used to communicate with resource infrastructure elements 722, in order to control the physical resources associated with the virtual computing devices. Device services manager 726 is communicatively coupled to the session manager 724 and each of the various managers to receive control signals from session manager 724 for activation to control the various managers.

Thus, device services manager 726 coordinates requests for the physical devices within resource infrastructure elements 722, such as computing devices, network devices, storage devices and the like. Device services manager 726 is responsible for setting up, shutting down and accessing physical devices. Session manager 724 redirects permissible requests that involve access to one or more physical devices to device services manager 726, so that services manager 726 can delegate one or more actions, depending on the request, to one of the following: subnet manager 740, storage manager 742, device manager 744, or boot manager 746. Also, similar to session manager 724, device services manager 726 is typically stateless, and its primary purpose is to coordinate operations between other managers, such as subnet manager 740, storage manager 742, device manager 744, and boot manger 746.

Device services manager 726 further operates to communicate with boot manager 746 to both allocate and de allocate, or free, IP addresses for the physical machines. Device services manager 726 also initiates and controls mounting and unmounting the shared persistent storage on the physical devices and machines by communicating and coordinating such actions with storage manager 742.

Device services manager 726 further serves as intermediary when a user tries to access the console of a specific computing device. Access to a computing device can be enabled by using a virtual network computing (VNC) viewer, for example, the said viewer using the remote frame buffer (RFB) protocol. A VNC viewer can be used, in one embodiment, for providing console terminal access to a computing device which is part of the DCE. Such a viewer can be used to display the screen of a computing device when the user chooses to "open a terminal" for a device in the DCE. A VNC viewer is but one way of providing such access and other software mechanisms can be used for this purpose. Such software can use the RFB protocol or another appropriate protocol, depending on the device being accessed and the device used for accessing that device.

Device services manager 726 also initiates and coordinates installing and uninstalling applications and operating systems on select physical machines and devices allocated for a DCE. In the case where device services manager 726 performs the installation and uninstallation of software, device services manager 726 sends such information to the license manager to update the number of licenses in use. Additionally, although not shown, one of skill in the art will realize that one or more functions performed by device services manager 726 can be separated into either sub-managers, or as other service layers consistent with the present invention.

Storage manager 742 operates to keep create, maintain and remove shared storage in each user's session, as initiated by session manager 724 and controlled by device services manager 726. Storage manager 742 allocates storage for a virtual subnet and mounts, or unmounts, this storage on all of the physical machines associated with the subnet. Storage manager 742 is configured to communicate between device services manager 726 and respective physical devices and machines of resource infrastructure elements 722. In one embodiment, the interface between storage manager 742 and device services manager 726 are each implemented as a session bean.

Device Manager 744 is configured to receive instructions from device services manager 726 and is further configured to allocate or to de allocate one or more physical machines or devices within resource infrastructure elements 722, and then to assign one or more of these machines as virtual machines selected and managed by configuration manager 734. For instance, when a user requests a computing resource, device manager 744 first verifies whether a physical computing device within resource infrastructure elements 722 are available, and then allocates such a computing resource to a particular DCE.

Device manager 744 also functions to install the proper operating system on one or more physical machines when device services manager 726 requests the particular physical machine with a particular operating system (i.e., includes one of many versions of software). Device manager 744 further functions to return a machine into a free pool when released by device services manager 726. In addition, if an actively assigned physical machine crashes, device manager 744 informs device services manager 726 that such a crash has occurred. It should be noted that the interface between the device manager 744 and others of the managers (or physical infrastructure elements 734) of dynamic configuration management system 710 can be implemented as a session bean.

Boot manager 746 is configured to receive instructions from device services manager 726 and is further configured to provide instructions to one or more boot servers within physical infrastructure elements 734. Boot manager 746 functions to retrieve and assign, or to free IP addresses associated with physical machines. For example, the boot manager 746 allocates an IP address for a physical machine before the machine is started up (i.e., booted up) and frees the address after the machine shuts down.

Subnet manager 740 is configured to receive delegated instructions from device services manager 726 and operates to allocate or de allocate a subnet. A subnet is a portion of a network that shares a common address component, but need not share common physical network devices, such as switches. On TCP/IP networks, subnets are defined as all physical devices and machines whose IP addresses have the same prefix. For example, all physical devices with an IP address starting with 100.100.100 would be part of a single subnet. The present invention can use other networks (rather than TCP/IP networks) and hence other mechanisms, in defining a subnet. As is known, dividing a network into subnets is useful for both security and performance reasons, as is the case with the present invention.

Each of the managers included in application server 715 are configured to communicate data and instructions for fetching, storing and updating information stored in data repository 720. For example, account manager 732 is coupled to exchange information with an accounts database 750 and stores user information for account manager 732. Assets manager 730 is coupled to exchange information with an assets database 752 for storing, updating and fetching data representing the status of physical assets, as determined by assets manager 730. Configuration manager 734 is coupled to a device configuration database 754 for storing, updating and fetching data representing the status of configuration information associated with the DCEs supported by dynamic configuration management system 710.

License manager 736 is coupled to a license database 756 for storing, updating and fetching data representing the status of licenses associated with operating systems and application software related to the configured virtual machines. Subnet manager 740 is coupled to a subnet database 758 for storing, updating and fetching data representing the physical machines and network devices associated with each virtual subnet. Each database and its constituent data structures and data within data repository 720 might be separated and configured as independent databases.

The databases described above might be a single database or might include several databases. In another example, these databases use a database server running a structured query language (SQL) database server and host additional databases each serving specific functions. Each of the managers of application server 715 can be configured to use Java beans to encapsulate database tables, so that the components can access and update the data structures (i.e., tables) of data repository 720 through these beans. The beans used by the managers included in application server 715 can connect to these databases through the Java Database Connectivity (JDBC) protocol. Of course, as one skilled in the art will appreciate, these managers can use other means of connectivity and/or encapsulation to communicate with the databases. Furthermore, the data structures of each of the databases are those most suitable for practicing the present invention, as one skilled in the art will also appreciate.

Resource infrastructure elements 722 include physical resources as well as resource handlers (i.e., physical resource managers). Physical resources include one or more network devices 760, one or more storage devices/storage servers 762, one or more capacity devices 764 (e.g., PCs, PDAs and other computing devices) and one or more boot servers 766. Resource handlers include specific daemons to control the physical resources: subnet daemons 770, storage daemons 772, device daemons 774 and boot daemons 776. For example, a Jini interface can be used to discover and lookup these specific daemons, which handle associated physical devices. Each of the daemons and their respective processes register themselves with a Jini registry so that discovered/looked-up remotely on demand. For instance, when boot manager 746 attempts to boot a computer (as one of capacity devices 764), boot manager 746 needs to locate a boot daemon 774, which maintains information regulating the state of the computer to boot the specific computer.

One or more boot daemons 776 are daemon process running on one of boot servers 766. When boot manager 746 receives a boot request, boot manager 746 locates the one of boot daemon 776 corresponding to the machine of capacity device 764 to be booted, and then the one of boot daemons 776 reboots the specific machine in capacity devices 764.

Storage daemon(s) 772 are daemon processes running on one or more storage servers 762, which typically is a server controlling a redundant array of inexpensive disks (RAID) storage unit. A RAID storage unit is a reliable storage medium consisting of an array of disks such that every bit of data is stored redundantly as multiple copies within the array. The storage is used for storing all software and data required to support the computing devices in all the DCEs hosted by dynamic configuration management system 710.

Subnet daemons 770 are daemon processes that are responsible for communicating to one or more of network devices 760, which can, in turn, communicate with other networks and subnets via a network connection 790. When a request for subnet allocation is received by subnet manager 740, subnet manager 740 delegates the request to one of subnet daemons 770, based, for example, on availability. Network devices 760 control the physical subnet connections allocated for each subnet in each DCE.

Figure 8:
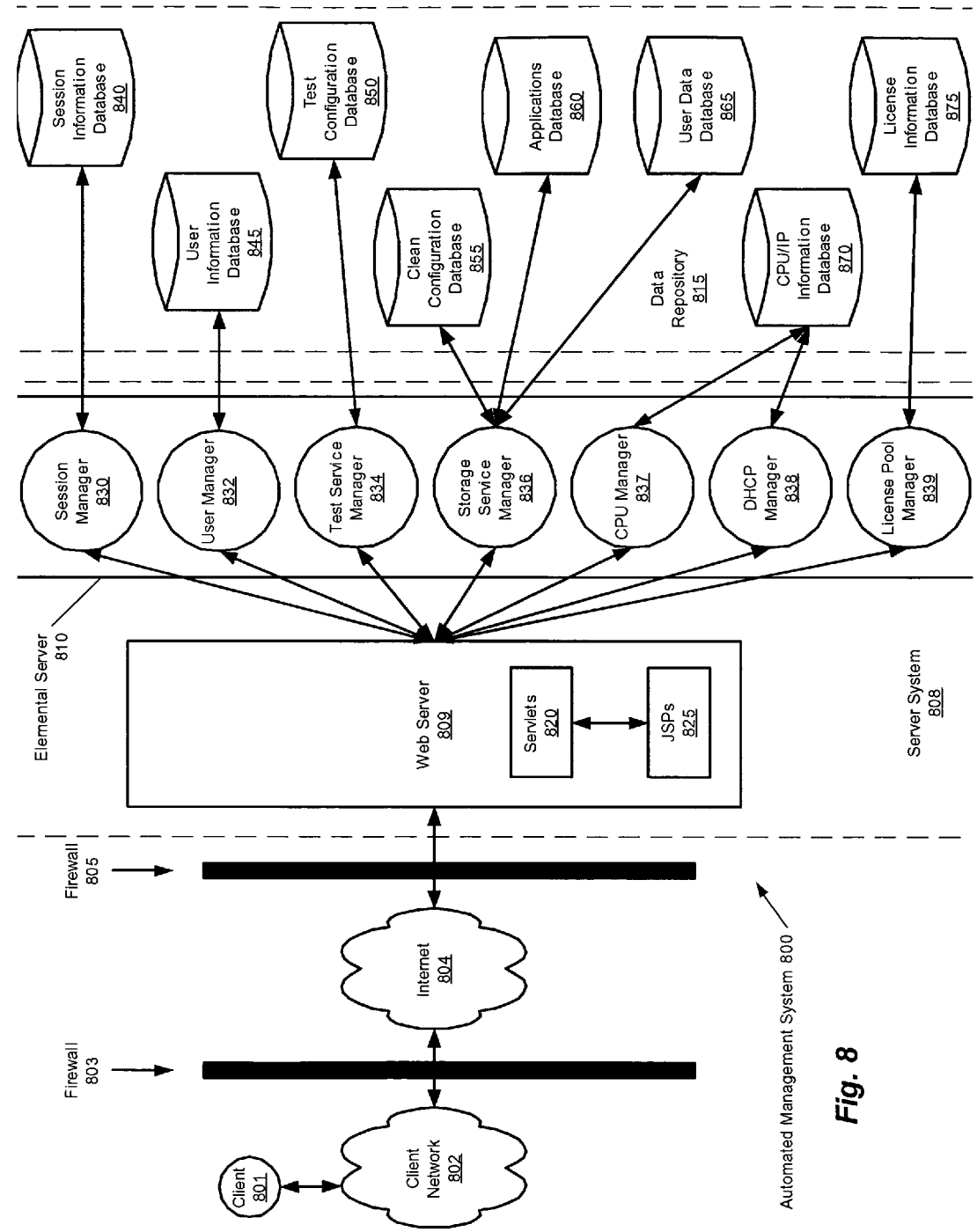
FIG. 8 is a block diagram illustrating an automated management system of the present invention.

FIG. 8 is a block diagram illustrating an automated management system (AMS) 800 of the present invention (and which is similar to that of FIG. 7) showing an example of different aspects of such a system in greater detail. In particular, FIG. 8 depicts the relationships between the various services and databases in greater detail. As shown, AMS 800 comprises client 801, communicatively coupled through a client network 802 and a firewall 803, to an interne 804, and then through a firewall 805 to a server system 808.

In FIG. 8, firewalls 803 and 805 maintain security within client network 802 and server system 808, respectively. In a simple configuration shown in FIG. 8, server system 808 comprises web server 809, elemental server 810 and a number of databases in a data repository 815. Web server 809 includes a number of JSPs (Java server pages) 820 which coordinate with a number of servlets 825 to generate the user interfaces presented to the user. Although user interfaces receive information (e.g., commands to open windows, to shut down machines and the like), such user interfaces may display information such as account and user information, machine configuration information, acknowledgments, error and state information, for example. These functionalities can be accomplished, at least in part, through communication with a session manager 830. In one embodiment, such communications with session manager 830 employ XML (extensible markup language) or other comparable language.

As shown in FIG. 8, server system 808 functions to provide a number of services—namely, a session manager 830, a user manager 832, a test service manager 834 and a storage service manager 836. Other services provided by server system 808 include a CPU manager 837, a DHCP manager 838 and a license pool manager 839. Although not specifically depicted, each of the aforementioned services are operable in a distributed environment having one or more servers and computing systems.

User manager 832 is responsible for maintaining user account information specific to given user. Such information can include, for example, the login name, password, user name and email address for the user. It will be apparent to one of skill in the art that additional information fields may be added to a user account as proves necessary. Such fields may be the machine login name and the user identification, for example. User beans can be uniquely identified, for example, using a tuples such as (account name, login name).

Session manager 830 acts as an intermediary between client 801 and server system 808. Requests from and responses to client 801 involve session manager 830. In one embodiment, session manager 830 functions solely to route these messages and replies between the appropriate managers and client. Therefore, session manager 830 may need to perform little or no computations, and in such case, has no state. As noted, session manager 830 may be implemented using a Java session bean, in one embodiment.

Test services manager 834 functions to map physical machines to a configuration that indicates a user's virtual selection of allocateable resources. Test services manager 834 acts as an intermediary between various sub-managers responsible for setting up, shutting down and accessing physical machines and a configuration manager (not shown). Like the user manager 832, test services manager 834 has no state, and its primary purpose is to coordinate operations between other managers. Additionally, test services manager 834 may roll back one or more previously completed services if an invoked service fails. It is also responsible for updating the state of the various machines and subnets. However, it should be noted that, in one embodiment, a machine's status is updated to up or down when test services manager 834 has completed these tasks.

In one embodiment, test services manager 834 delegates certain operations initiated by session manager 830 to other sub-managers. The operations are (1) startup of a machine; (2) shutdown of a machine; (3) shutdown of the entire network; and (4) opening a machine window.

The sub-managers to which these operations are delegated include a startup service sub-manager (not shown) and a storage service sub-manager (not shown). As implied by its name, the startup service sub-manager functions to startup and shut down machines. Upon identifying the appropriate machines for starting up or shutting down, the startup service sub-manager directs CPU manager 837 to execute the task. After a set of machines are started up, for example, the sub-manager will return those machines in a vector so that those machines can be shut down if a rollback is needed. The startup service sub-manager is also responsible for keeping track of the number of operating system licenses available in the license manager (described below) and updating the number of running machines within server system 808. An addition function of the startup service sub-manager is to communicate with DHCP manager 838 to both allocate and free IP addresses for the machines. The storage service sub-manager is responsible for mounting and unmounting the shared persistent storage on the machines. This functionality is achieved by communicating and coordinating with storage service manager 836.

Other sub-managers to which tasks are delegated by the test service manager are a login service sub-manager (not show) and an application service sub-manager (not shown) for installing and uninstalling applications on the user selected machines. The applications sub-manager keeps in contact with license pool manger 839 to update the number of licenses. The application sub-manager will invoke the CPU service manager 837 or an application service manager (depending on the implemented embodiment) to perform the installs and uninstalls. Alternately, neither the application service sub-manager or manager is implemented so that all installs/uninstall are performed by the startup service sub-manager.

The login service sub-manager functions to log a user into a machine and opens a VNC window of the machine's desktop for the user by coordinating with a login manager (not shown). It will be appreciated that one or more of the aforementioned sub-managers can be implemented as stateless session beans, such that some variables are cached. Additionally, although not shown, one of skill in the art will realize that one or more of the sub-managers and associated functionalities may be combined, or implemented as other service layers consistent with an approach such as that described herein.

In FIG. 8, storage service manager 836 functions to keep track of all of the shared storage in a session. Storage service manager 836 allocates storage for a particular enterprise, and is able to mount/unmount this storage on various of the machines in the enterprise. Storage manager 836 interacts directly with the storage service sub-manager (of test service manager 834). Storage service manager 836 typically has a daemon running on each machine within server system 808 and storage service manager 836 communicates with these daemons through a lookup service. In one embodiment, the interface between storage service manager 836 and the storage service sub-manager is implemented as a session bean.

CPU manager 837 functions to track the machines that are within AMS 800, as well as to assign one or more of these machines as virtual machines. When the start up service sub-manager requests a machine with a particular CPU and operating system, CPU manager 837 locates such a machine and, if need be, installs the proper operating system on the machine. CPU manager 837 further functions to return a machine into a free pool when released by start-up service. In addition, if an actively used machine crashes, CPU manager 837 informs the start up service manager that such a crash occurred. Machines in AMS 800 run a CPU-based daemon to keep track of the active and running machines. A lookup service is utilized to perform this functionality. It should be noted that the interface between the CPU manager 837 and the rest of AMS 800 can be implemented as a session bean, for example.

DHCP manager 838 functions to retrieve and free IP addresses. Server system 808 allocates an IP address for a machine before the machine is started and frees the address after the machine shuts down.

License pool manager 839 keeps track of the number of operating systems and application licenses utilized by AMS 800. Each operating system and application license has a maximum number of licenses. License pool manager 839 prevents AMS 800 from exceeding the number of allocated licenses. Each license in license manager 839 can be implemented, for example, as an entity bean.

As shown in FIG. 8, the aforementioned services utilize one or more databases for storing their associated information. In one embodiment, data repository 815 utilizes a database server and hosts additional databases, each serving specific ones of the functions supported by elemental server 810. Further, the database architecture employed in the databases of data repository 815 can contain, for example, an underlying ODBC-compliant SQL server database. Such a database architecture allows for platform-independent data transfer, and may operate with other ODBC-compliant databases, or with other types of databases.

Data repository 815 is depicted in FIG. 8 as including a number of databases, including, for example, a session information database 840, a user information database 845, a test configuration database 850, a clean configuration database 855, an applications database 860, a user data database 865, a CPU/IP information database 870, and a license information database 875. Session information database 840 stores information relating one or more sessions for session manager 830. User information database 845 stores user information for user manager service 832. Test configuration database 850 stores associated information relating to test configuration data and communicates with storage service manager 836. Clean configuration database 855, applications database 860, and user data database 865 store computer configurations, applications, and user data information, respectively, for storage service manager 836. CPU/IP information database 870 is coupled to CPU manager, and DHCP manager 838, as well. License information database 875 stores licensing information, and is communicatively coupled to license pool manger 839.

An Example Computing and Network Environment

Figure 9:
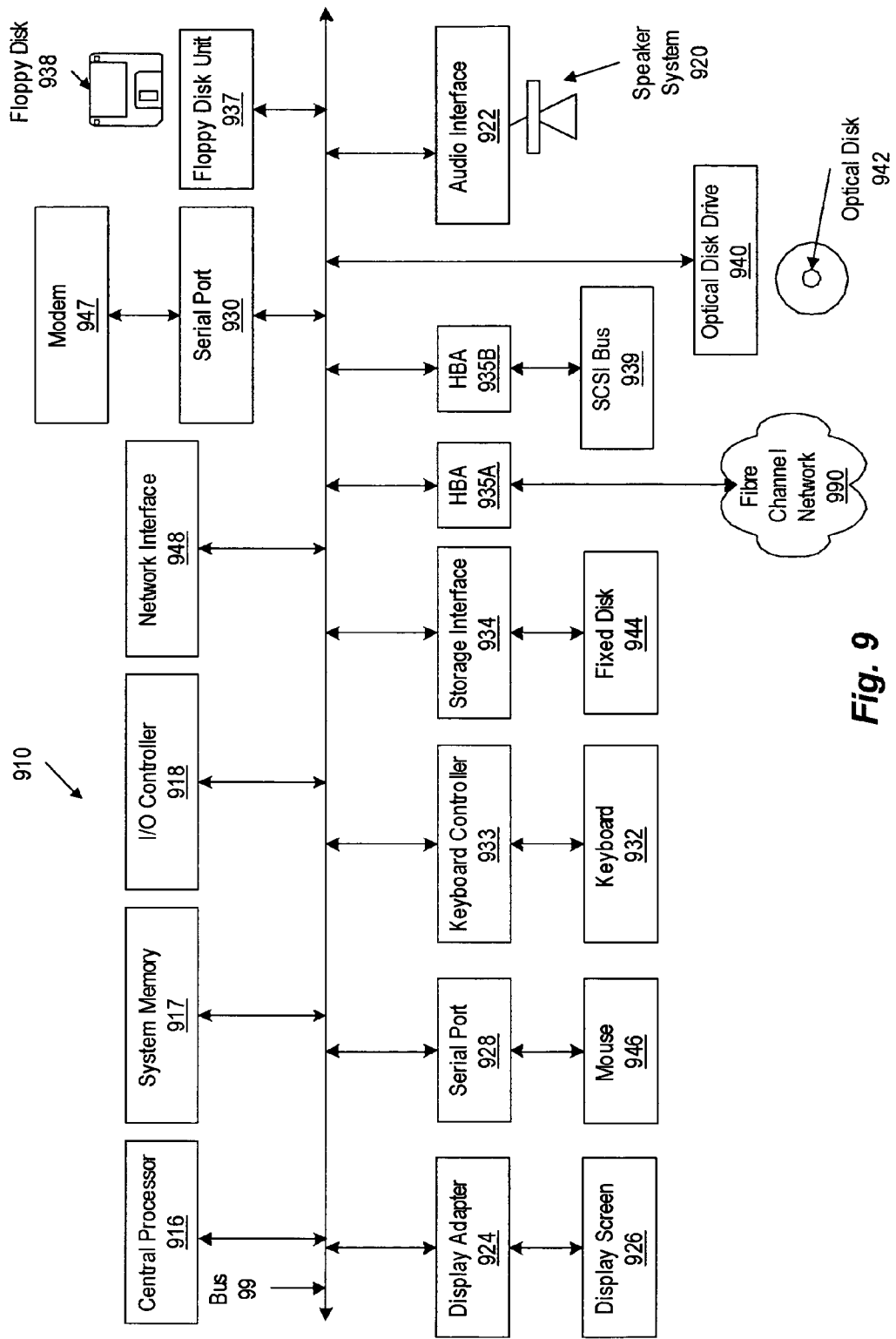
FIG. 9 is a block diagram illustrating an example computer system suitable for implementing the present invention.

FIG. 9 depicts a block diagram of a computer system 910 suitable for implementing the present invention. Computer system 910 includes a bus 912 which interconnects major subsystems of computer system 910, such as a central processor 916, a system memory 917 (typically RAM, but which may also include ROM, flash RAM, or the like), an input/output (I/O) controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk unit 937 operative to receive a floppy disk 938, a host bus adapter (HBA) interface card 935A operative to connect with a fibre channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 916 and system memory 917, which may include read-only memory (ROM) or flash memory (neither shown), and random access memory (RAM) (not shown), as previously noted. The RAM is generally the main memory into which the operating system and application programs are loaded and typically affords at least 154 megabytes of memory space. The ROM or flash memory may contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., a fixed disk 944), an optical drive (e.g., optical disk drive 940), floppy disk unit 937 or other storage medium. Additionally, applications may be in the form of electronic signals modulated in accordance with the application and data communication technology when accessed via network modem 947 or network interface 948.

Storage interface 934, as with the other storage interfaces of computer system 910, may connect to a standard computer readable medium for storage and/or retrieval of information, such as fixed disk drive 944. Fixed disk drive 944 may be a part of computer system 910 or may be separate and accessed through other interface systems. It will be apparent that a virtual loader of the present invention can be implemented, for example, using a hard disk drive such as fixed disk 944. Modem 947 may provide a direct connection to a remote server via a telephone link or to the Internet via an interne service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 9 to be present to practice the present invention. The devices and subsystems may be interconnected in different ways from that shown in FIG. 9. The operation of a computer system such as that shown in FIG. 9 is readily known in the art and is not discussed in detail in this application. Code to implement the present invention may be stored in computer-readable storage media such as one or more of system memory 917, fixed disk 944, optical disk 942, or floppy disk 938. Additionally, computer system 910 may be any kind of computing device, and so includes personal data assistants (PDAs), network appliance, X-window terminal or other such computing devices. The operating system provided on computer system 910 may be MS-DOS®, MS-WINDOWS®, OS/2®, UNIX®, Linux®, or another known operating system. Computer system 910 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 910). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Figure 10:
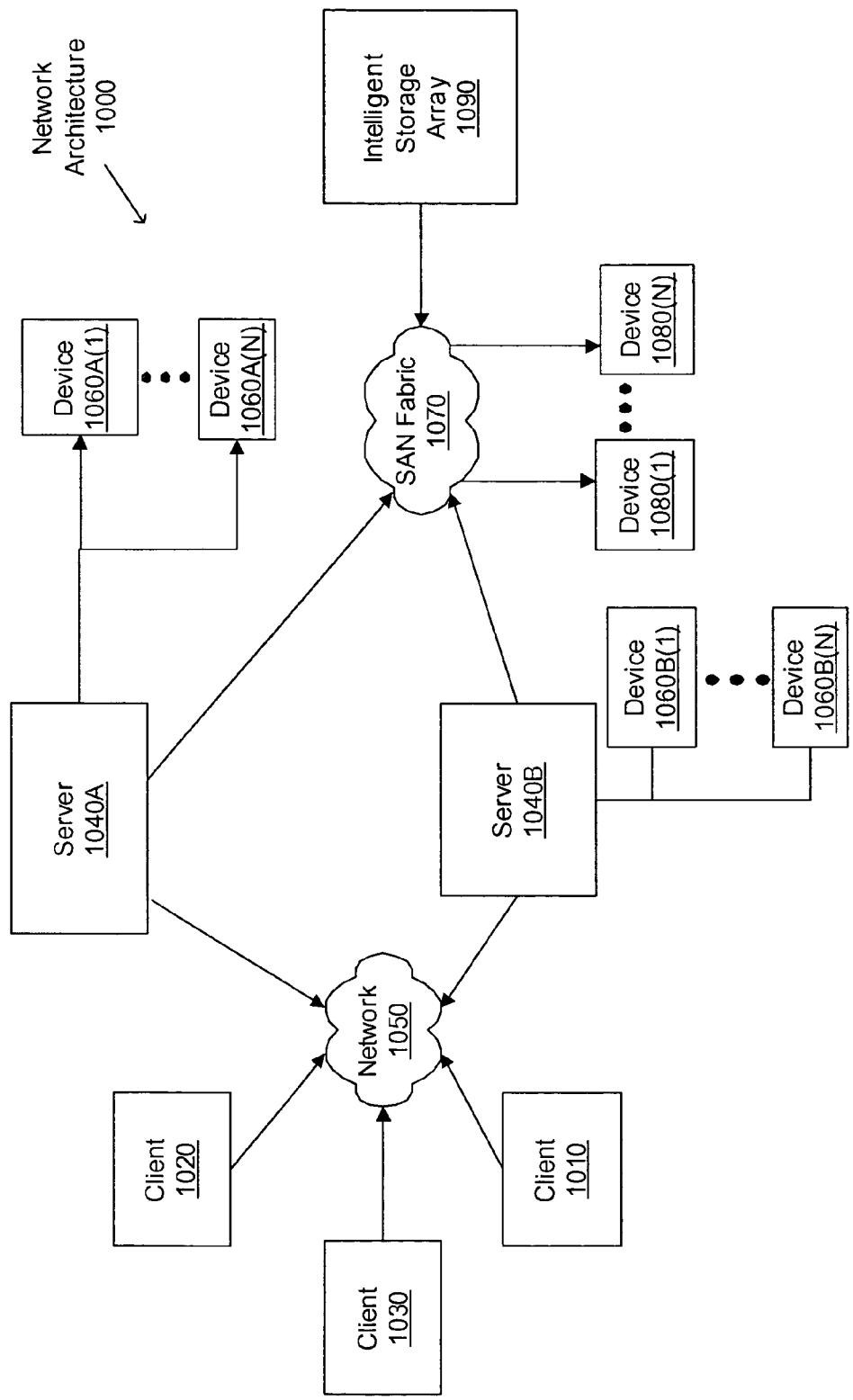
FIG. 10 is a block diagram illustrating a network architecture suitable for implementing the present invention.

FIG. 10 is a block diagram depicting a network architecture 1000 in which client systems 1010, 1020 and 1030, as well as storage servers 1040A and 1040B (any of which can be implemented using a computer system such as computer system 910), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070. As will be apparent, a virtual loader of the present invention can also be implemented, for example, using one or more storage devices such as storage devices 1060A(1)-(N), storage devices 1060B(1)-(N) or storage devices 1080(1)-(N) (via SAN fabric 1070).

It will be noted that the variable identifier "N" is used in several instances in FIG. 10 to more simply designate the final element of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present invention is not limited to the Internet or any particular network-based environment.

While particular embodiments of the present invention have been shown and described, it will be apparent to those skilled in the art that, based upon the teachings herein, changes and modifications may be made without departing from this invention and its broader aspects and, therefore, the appended claims are to encompass within their scope all such changes and modifications as are within the true scope of this invention. Moreover, while the invention has been particularly shown and described with reference to these specific embodiments, it will be understood by those skilled in the art that the foregoing and other changes in the form and details may be made therein without departing from the scope of the invention.

What is claimed is:

1. An apparatus comprising:
a management server, wherein
    said management server is configured to manage a distributed computing environment comprising a plurality of managed resources,
    a first set of said plurality of managed resources is configured to perform a first activity,
    said management server comprises an elemental server,
    said elemental server comprises
        a processor configured to implement
            a resource management module, and
            a proper response learning module,
    said resource management module comprises:
        a detection module,
        a decision module, and
        an implementation module, and
    said proper response learning module comprises
        a monitoring module, and
        a storing module; and
a protocol layer communicatively coupled to said elemental server, wherein
    said protocol layer comprises:
        a network management protocol interface, and
        an information technology abstraction protocol interface,
    said detection module is configured to detect a workload condition of said first set of managed resources, via said network management protocol interface,
    said workload condition occurs while said first set performs said first activity,
    said decision module is configured to determine whether said workload condition requires reconfiguration of said first set of managed resources, in response to a detection of said workload condition,
    said reconfiguration comprises allocation of a first managed resource of said plurality of managed resources to said first set of managed resources,
    said allocation comprises installation of an application on said first managed resource,
    said application is configured to accomplish said first activity,
    said implementation module is configured to send at least one command to said first managed resource, via said information technology abstraction protocol interface,
    said at least one command is sent in response to a determination that said workload condition requires said reconfiguration of said first set of managed resources,
    said at least one command is configured to cause said allocation of said first managed resource to said first set of managed resources,
    said monitoring module is configured to monitor said first set of managed resources after said reconfiguration for an outcome, and
    said storing module is configured to store said workload condition, said reconfiguration, and said outcome as historical information, wherein
        said historical information is used to automatically determine whether a proper response to a future workload condition requires said reconfiguration.

2. The apparatus of claim 1, wherein
said plurality of managed resources are communicatively coupled to said protocol layer.

3. The apparatus of claim 1, wherein said first managed resource is one of a networking component, computing component and storage component.

4. The apparatus of claim 1, wherein
said protocol layer is configured to allow said resource management module to manage said plurality of managed resources by virtue of:
said network management protocol interface being communicatively coupled to said detection module,
said network management protocol interface being configured to allow said detection module to receive workload information from said plurality of managed resources via a network management protocol,
said information technology abstraction protocol interface being communicatively coupled to said implementation module, and
said information technology abstraction protocol interface being configured to allow said implementation module to send commands to said plurality of managed resources via an information technology abstraction protocol.

5. The apparatus of claim 1, wherein said workload condition is one of a time-based condition, a bandwidth condition, a storage capacity condition and a processing capacity condition.

6. The apparatus of claim 2, wherein
said protocol layer is coupled between said elemental server and said first managed resource, and
said network management protocol interface is a simple network management protocol (SNMP) interface.

7. The apparatus of claim 1, wherein said management server further comprises:
a plurality of management modules coupled to said elemental server.

8. The apparatus of claim 7, wherein said management modules comprise at least one of a traffic management module, a monitoring module, a cluster management module and a policy management module.

9. The apparatus of claim 7, further comprising:
an interface coupled between said elemental server and a one of said management modules.

10. The apparatus of claim 9, wherein said interface includes:
an agent adapter, wherein
said agent adapter is associated with said one of said management modules, and
said agent adapter is configured to translate between a communication protocol of said elemental server and a communication protocol of said one of said management modules.

11. A method, implemented using a computer, comprising:
managing a distributed computing environment comprising a plurality of managed resources, using a processor of the computer, wherein
a first set of said plurality of managed resources is configured to perform a first activity,
said managing is performed by a management server executed by said processor, and
said managing comprises
performing resource management, and
learning proper responses to various workload conditions,
said performing resource management comprises:
detecting, using the processor, a workload condition of said first set of managed resources, via a network management protocol, wherein
said workload condition occurs while said first set performs said first activity;
automatically determining, using the processor, whether said workload condition requires reconfiguration of said first set of managed resources, wherein
said automatically determining is performed in response to said detecting,
said reconfiguration comprises allocating a first managed resource of said plurality of managed resources to said first set of managed resources,
said allocating comprises installing an application on said first managed resource, and
said application is configured to accomplish said first activity; and
sending at least one command to said first managed resource via an information technology abstraction protocol, in response to a determination that said workload condition requires said reconfiguration, wherein
said at least one command is configured to cause said allocating said first managed resource to said first set of managed resources; and
said learning proper responses to various workload conditions comprises:
monitoring said first set of managed resources after said reconfiguration for an outcome; and
storing said workload condition, said reconfiguration, and said outcome as historical information, wherein
said historical information is used to automatically determine whether a proper response to a future workload condition requires said reconfiguration.

12. The computer-implemented method of claim 11, wherein said detecting comprises:
determining a capacity of a resource of the first set of managed resources;
determining a current workload of said resource; and
determining if said current workload exceeds said capacity.

13. The computer-implemented method of claim 12, further comprising:
if said current workload exceeds said capacity, determining if said resource is a constrained resource, wherein
an availability of said constrained resource is limited; and
if said resource is a constrained resource:
determining a priority of a second activity in need of said resource, and
determining if said priority is sufficient to require said reconfiguration.

14. The computer-implemented method of claim 11, wherein
said management server is configured to receive workload information from said plurality of managed resources via said network management protocol,
said detecting said workload condition uses said workload information to detect said workload condition, and
said management server is configured to send commands to said plurality of managed resources via said information technology abstraction protocol.

15. The computer-implemented method of claim 11, wherein
said workload condition is one of a time-based condition, a bandwidth condition, a storage capacity condition and a processing capacity condition.

16. The computer-implemented method of claim 15, wherein
said reconfiguration further comprises an action taken in response to said workload condition, and
said action is one of a condition-specific action and a condition-neutral action.

17. The computer-implemented method of claim 14, wherein said automatically determining whether said workload condition requires reconfiguration is based on at least one of a current policy and an action definition.

18. The computer-implemented method of claim 14, wherein said learning proper responses to various workload conditions further comprises:
determining a desirability of said outcome resulting from said reconfiguration, wherein
said desirability indicates whether said reconfiguration is an optimal solution to said future workload condition, and
said desirability is stored as said historical information.

19. The computer-implemented method of claim 18, wherein
said determining said desirability uses at least one of a trending technique and a real-time feedback technique, and
said trending technique uses said historical information.

20. A workload management system comprising:
means for managing a distributed computing environment comprising a plurality of managed resources, wherein
a first set of said plurality of managed resources is configured to perform a first activity,
said means for managing comprises an elemental server, said elemental server comprises
means for resource management, and
means for learning proper responses to various workload conditions,
said means for resource management comprises:
means for detecting a workload condition of said first set of managed resources while said first set performs said first activity,
means for automatically determining whether said workload condition requires reconfiguration of said first set of managed resources, wherein
said means for automatically determining is responsively coupled to said means for detecting said workload condition,
said reconfiguration comprises allocation of a first managed resource of said plurality of managed resources to said first set of managed resources,
said allocation comprises installation of an application on said first managed resource, and
said application is configured to accomplish said first activity, and
means for sending at least one command to said first managed resource, wherein
said means for sending is responsively coupled to said means for automatically determining, and
said at least one command is configured to cause said allocation of said first managed resource to said first set of managed resources; and
said means for learning proper responses to various workload conditions comprises:
means for monitoring said first set of managed resources after said reconfiguration for an outcome, and
means for storing said workload condition, said reconfiguration, and said outcome as historical information, wherein
said historical information is used to automatically determine whether a proper response to a future workload condition requires said reconfiguration.

21. The workload management system of claim 20, wherein said means for detecting said condition comprises:
means for determining a capacity of a resource of the first set of managed resources;
means for determining a current workload of said resource; and
means for determining if said current workload exceeds said capacity.

22. The workload management system of claim 21, further comprising:
means for determining if said resource is a constrained resource, if said current workload exceeds said capacity, wherein
an availability of said constrained resource is limited; and
if said resource is a constrained resource,
means for determining a priority of a second activity in need of said resource, and
means for determining if said priority is sufficient to require said reconfiguration.

23. The workload management system of claim 20, wherein
said means for detecting said workload condition is configured to receive workload information from said plurality of managed resources via a network management protocol, and
said means for sending is configured to send commands to said plurality of managed resources via an information technology abstraction protocol.

24. A computer program product comprising:
a set of instructions, executable on a computer system, wherein
said instructions are configured to implement a management server that manages a distributed computing environment comprising a plurality of managed resources,
a first set of said plurality of managed resources is configured to perform a first activity,
said management server comprises an elemental server comprising
a resource management module, and
a proper response learning module,
said resource management module is implemented by said set of instructions that comprises:
a first set of instructions, executable on said computer system, configured to detect a workload condition of said first set of managed resources, via a network management protocol, wherein
said workload condition occurs while said first set performs said first activity,
a second set of instructions, executable on said computer system, configured to automatically determine whether said workload condition requires reconfiguration of said first set of managed resources, wherein
said second set of instructions are responsive to said first set of instructions,
said reconfiguration comprises allocation of a first managed resource of said plurality of managed resources to said first set of managed resources,
said allocation comprises installation of an application to said first managed resource, and said application is configured to accomplish said first activity, and
a third set of instructions, executable on said computer system, configured to send at least one command to said first managed resource via an information technology abstraction protocol, wherein said third set of instructions are responsive to said second set of instructions, and
said at least one command is configured to cause said allocation of said first managed resource to said first set of managed resources, and
said proper response learning module is implemented by said set of instructions that comprises:
a fourth set of instructions, executable on said computer system, configured to monitor said first set of managed resources after said reconfiguration for an outcome, and
a fifth set of instructions, executable on said computer system, configured to store said workload condition, said reconfiguration, and said outcome as historical information, wherein
said historical information is used to automatically determine whether a proper response to a future workload condition requires said reconfiguration; and
computer readable non-transitory storage media, wherein said set of instructions is encoded in said computer readable non-transitory storage media.

25. The computer program product of claim 24, wherein said first set of instructions comprises
a first subset of said first set of instructions, executable on said computer system, configured to determine a capacity of a resource of the first set of managed resources;
a second subset of said first set of instructions, executable on said computer system, configured to determine a current workload of said resource; and
a third subset of said first set of instructions, executable on said computer system, configured to determine if said current workload exceeds said capacity.

26. The computer program product of claim 25, further comprising:
a sixth set of instructions, executable on said computer system, configured to determine if said resource is a constrained resource, if said current workload exceeds said capacity, wherein an availability of said constrained resource is limited; and
a seventh set of instructions, executable on said computer system, configured to, if said resource is a constrained resource, determine a priority of a second activity in need of said resource, and determine if said priority is sufficient to require said reconfiguration.

27. The computer program product of claim 24, wherein said second set of instructions comprises:
a first subset of said second set of instructions, executable on said computer system, configured to monitor said first set of managed resources after said allocation of said first managed resource to said first set of managed resources; and
a second subset of said second set of instructions, executable on said computer system, configured to determine a desirability of an outcome resulting from said allocation.

28. The computer program product of claim 27, wherein
said second subset of said second set of instructions uses at least one of a trending technique and a real-time feedback technique, and
said trending technique uses historical data.

29. The apparatus of claim 1, wherein
said resource management module is further configured to
receive a first activity request for a constrained resource of said first set of managed resources,
receive a second activity request for said constrained resource of said first set of managed resources, wherein
said constrained resource has limited availability,
determine a first priority for said first activity request and a second priority for said second activity request,
determine whether said second activity request preempts said first activity request, based on said first priority and said second priority,
redirect said first activity request, in response to a determination that said second activity request preempts said first activity request, and
cause second activity request to be performed by said constrained resource, in response to the determination that said second activity request preempts said first activity request.

30. The apparatus of claim 1, wherein
said reconfiguration further comprises re-allocation of a second managed resource to said first set of managed resources,
said second set of managed resources is originally from a second set of the plurality of managed resources,
said second managed resource is originally configured with a second application that is configured to accomplish a second activity performed by said second set of managed resources,
said re-allocation comprises removal of said second application from said second managed resource and installation of said first application to said second managed resource, and
said at least one command is configured to cause said re-allocation.

31. The apparatus of claim 1, wherein
said reconfiguration further comprises de-allocation of a second managed resource from said first set of managed resources,
said second managed resource is originally configured with said first application,
said de-allocation comprises removal of said first application, and
said at least one command is configured to cause said de-allocation.

* * * * *